(12) United States Patent
Adler et al.

(10) Patent No.: US 9,715,816 B1
(45) Date of Patent: Jul. 25, 2017

(54) REMINDERS BASED ON ENTRY AND EXIT OF VEHICLE

(71) Applicant: Apple Inc., Cupertino, CA (US)

(72) Inventors: Scott Adler, Saratoga, CA (US); Viktor Miladinov, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/051,523

(22) Filed: Feb. 23, 2016

Related U.S. Application Data

(63) Continuation of application No. 14/825,754, filed on Aug. 13, 2015, now abandoned.

(60) Provisional application No. 62/171,864, filed on Jun. 5, 2015, provisional application No. 62/171,925, filed on Jun. 5, 2015, provisional application No. 62/169,351, filed on Jun. 1, 2015.

(51) Int. Cl.
 G08B 1/08 (2006.01)
 G08B 21/24 (2006.01)

(52) U.S. Cl.
 CPC ....... *G08B 21/24* (2013.01); *H04Q 2209/823* (2013.01)

(58) Field of Classification Search
 CPC ................... G08B 21/24; H04Q 2209/823
 See application file for complete search history.

(56) References Cited

U.S. PATENT DOCUMENTS

| | | | |
|---|---|---|---|
| 5,541,981 A | 7/1996 | Lynn | |
| 7,424,545 B2 | 9/2008 | Ducheneaut et al. | |
| 7,889,101 B2 * | 2/2011 | Yokota | G08G 1/096827 340/995.1 |
| 8,050,665 B1 | 11/2011 | Orbach | |
| 8,054,180 B1 | 11/2011 | Scofield et al. | |

(Continued)

FOREIGN PATENT DOCUMENTS

| | | |
|---|---|---|
| EP | 2469303 | 6/2012 |
| EP | 2665023 | 11/2013 |

(Continued)

OTHER PUBLICATIONS

US 9,474,045, 10/2016, Jackson et al. (withdrawn)

(Continued)

*Primary Examiner* — Joseph Feild
*Assistant Examiner* — Rufus Point
(74) *Attorney, Agent, or Firm* — Kilpatrick Townsend & Stockton LLP

(57) ABSTRACT

Systems and methods for providing a reminder to a mobile device are provided. After receiving a request to establish a reminder from a user, a plurality of reminder options are provided. Each reminder option corresponds to a different category of reminders, and a first reminder option of the reminder options corresponds to a connection state of the mobile device with a processor of a vehicle. A selection of the first reminder option for the reminder is received. An indication of a transition that is to trigger the reminder is also received. The transition corresponds to the mobile device establishing a wireless connection to a processor of the vehicle or the mobile device disconnecting from the vehicle processor. Content for the reminder is received. In response to detecting the transition between the mobile device and the processor of the vehicle, the content of the reminder is provided to the user.

20 Claims, 9 Drawing Sheets

(56) References Cited

U.S. PATENT DOCUMENTS

| | | | |
|---|---|---|---|
| 8,245,252 B2 | 8/2012 | Gee et al. | |
| 8,341,241 B2 | 12/2012 | Meuninck et al. | |
| 8,629,767 B2 | 1/2014 | Stefanovski et al. | |
| 8,686,852 B2 | 4/2014 | Ben-Dayan et al. | |
| 8,838,138 B2 | 9/2014 | Modali et al. | |
| 8,941,478 B2* | 1/2015 | Mirle | B60R 16/02 340/384.1 |
| 9,262,605 B2 | 2/2016 | Kim et al. | |
| 9,319,843 B2 | 4/2016 | Lerenc | |
| 9,327,645 B2* | 5/2016 | Raman | B60Q 9/00 |
| 9,489,247 B2* | 11/2016 | Evans | G06F 9/54 |
| 9,506,773 B1 | 11/2016 | Cherubini et al. | |
| 9,552,717 B1* | 1/2017 | Rudolph | G08B 21/24 |
| 9,554,050 B2 | 1/2017 | Dave et al. | |
| 2001/0028304 A1* | 10/2001 | I'Anson | G08B 1/08 340/539.1 |
| 2001/0029194 A1 | 10/2001 | Ketola et al. | |
| 2005/0102607 A1 | 5/2005 | Rousselle et al. | |
| 2005/0190080 A1* | 9/2005 | Flick | B60R 25/04 340/989 |
| 2006/0077055 A1* | 4/2006 | Basir | G06Q 10/109 340/539.13 |
| 2006/0218029 A1 | 9/2006 | Chin | |
| 2006/0273930 A1 | 12/2006 | Godden et al. | |
| 2007/0115837 A1 | 5/2007 | Elie-Dit-Cosaque et al. | |
| 2007/0241885 A1 | 10/2007 | Clipsham | |
| 2008/0079566 A1 | 4/2008 | Singh et al. | |
| 2008/0150959 A1 | 6/2008 | Marui et al. | |
| 2008/0287119 A1 | 11/2008 | Yasuda et al. | |
| 2009/0077159 A1 | 3/2009 | Murakami et al. | |
| 2009/0249222 A1 | 10/2009 | Schmidt et al. | |
| 2010/0026526 A1* | 2/2010 | Yokota | G08G 1/096827 340/996 |
| 2011/0084807 A1* | 4/2011 | Logan | H04Q 9/00 340/10.1 |
| 2011/0185029 A1 | 7/2011 | Jain et al. | |
| 2011/0314404 A1 | 12/2011 | Kotler et al. | |
| 2012/0001843 A1 | 1/2012 | Gravino | |
| 2012/0029964 A1* | 2/2012 | Tengler | G06Q 10/1095 705/7.19 |
| 2012/0069388 A1 | 3/2012 | Nakatani et al. | |
| 2012/0197523 A1* | 8/2012 | Kirsch | G01C 21/362 701/426 |
| 2012/0242482 A1 | 9/2012 | Elumalai et al. | |
| 2012/0244814 A1 | 9/2012 | Okayasu | |
| 2012/0265535 A1 | 10/2012 | Bryant-Rich et al. | |
| 2012/0299717 A1 | 11/2012 | Yoshino et al. | |
| 2012/0302258 A1 | 11/2012 | Pai et al. | |
| 2013/0138622 A1 | 5/2013 | Ayers et al. | |
| 2013/0245986 A1 | 9/2013 | Grokop et al. | |
| 2013/0257604 A1* | 10/2013 | Mirle | B60R 16/02 340/425.5 |
| 2013/0307681 A1* | 11/2013 | Borg | G06Q 10/109 340/517 |
| 2013/0316720 A1 | 11/2013 | Dwyer et al. | |
| 2013/0324093 A1 | 12/2013 | Santamaria et al. | |
| 2013/0324160 A1 | 12/2013 | Sabatellil et al. | |
| 2013/0336258 A1 | 12/2013 | Young et al. | |
| 2014/0009285 A1 | 1/2014 | Khachaturov et al. | |
| 2014/0099921 A1 | 4/2014 | Weiss | |
| 2014/0118272 A1 | 5/2014 | Gunn | |
| 2014/0248910 A1 | 9/2014 | Dave et al. | |
| 2014/0266810 A1* | 9/2014 | Hatton | G08B 25/016 340/989 |
| 2014/0269363 A1 | 9/2014 | Lee et al. | |
| 2014/0274203 A1* | 9/2014 | Ganong, III | H04W 52/0251 455/556.1 |
| 2014/0280439 A1* | 9/2014 | Hatton | H04L 67/12 709/201 |
| 2014/0280580 A1 | 9/2014 | Langlois et al. | |
| 2014/0304363 A1 | 10/2014 | Mhatre et al. | |
| 2014/0342718 A1 | 11/2014 | Chen et al. | |
| 2015/0005978 A1 | 1/2015 | Nakakita et al. | |
| 2015/0137996 A1 | 5/2015 | Terashima | |
| 2015/0143281 A1 | 5/2015 | Mehta et al. | |
| 2015/0181511 A1 | 6/2015 | Abraham et al. | |
| 2015/0350413 A1* | 12/2015 | Ma | H04M 1/72577 455/418 |
| 2015/0370884 A1 | 12/2015 | Hurley et al. | |
| 2016/0086141 A1* | 3/2016 | Jayanthi | H04M 1/72572 705/7.21 |
| 2016/0156773 A1* | 6/2016 | Chanda | H04M 1/72522 455/414.1 |
| 2016/0187452 A1 | 6/2016 | Schillings | |
| 2016/0309310 A1* | 10/2016 | Herman | H04M 3/432 |
| 2016/0343233 A1* | 11/2016 | Wassef | G08B 21/24 |
| 2016/0349953 A1 | 12/2016 | Adler et al. | |
| 2016/0358451 A1* | 12/2016 | Adler | G08B 21/24 |
| 2017/0048376 A1* | 2/2017 | Logan | H04M 1/72533 |

FOREIGN PATENT DOCUMENTS

| | | |
|---|---|---|
| WO | 2012022021 | 2/2012 |
| WO | 2014209374 | 12/2014 |
| WO | 2016196092 A1 | 12/2016 |
| WO | 2016197060 A1 | 12/2016 |

OTHER PUBLICATIONS

U.S. Appl. No. 14/731,249, "Notice of Allowance", mailed Jun. 6, 2016, 10 pages.

U.S. Appl. No. 14/731,249, "Notice of Allowance", mailed Nov. 3, 2016, 10 pages.

U.S. Appl. No. 14/731,249, "Corrected Notice of Allowability", mailed Nov. 14, 2016, 10 pages.

"Non-Final Office Action" for U.S. Appl. No. 14/863,315, mailed Feb. 22, 2017, 32 pages.

Ugale, et al., "A Location-Based Personal Task Reminder for Mobile Users in Wireless College Campus Environment (Indoor and Outdoor)." International Journal of Computer Techniques, 2015, vol. 2, No. 1, 7 pages.

Trigger, Ego Motion, product data sheet, <https:iNJWW.google.comi?gws_rd::ssl#q: Trigger+EgoMotion, 2015, 5 pages.

Hoffman, How to Automatically Run Programs and Set Reminders With the Windows Task Scheduler, available online at http://www.howtogeek.com/123393/how-to-automatically-run-programs-and-set-reminders-with-the-windows-task-scheduler, Aug. 31, 2012, 7 pages.

Nokia Iran, Siri vs. Cortana—Happy Anniversary (Commercial), available online at https://www.youtube.com/watch?v=8e8rZxRpMlo, Jul. 28, 2014, 1 page.

OSX Daily, Launch Files & Applications on a Scheduled Date with Calendar for Mac OS X, available online at http://osxdaily.com/2013/04/15/1aunchfile-app-scheduled-date-mac-os-x, Apr. 15, 2013, 5 pages.

International Application No. PCT/US2016/033972, International Search Report and Written Opinion mailed on Aug. 2, 2016, 14 pages.

International Application No. PCT/US2016/035911, International Search Report and Written Opinion mailed on Jul. 27, 2016, 11 pages.

* cited by examiner

REMINDERS BASED ON ENTRY AND EXIT OF VEHICLE

CROSS-REFERENCES TO RELATED APPLICATIONS

The present application is a continuation of U.S. patent application Ser. No. 14/825,754 entitled "REMINDERS BASED ON ENTRY AND EXIT OF VEHICLE," filed Aug. 13, 2015, and claims the benefit of and priority to U.S. Provisional Application No. 62/171,864, filed Jun. 5, 2015; U.S. Provisional Application No. 62/171,925, filed Jun. 5, 2015; and U.S. Provisional Application No. 62/169,351, filed Jun. 1, 2015, the entire contents of which are incorporated herein by reference for all purposes.

FIELD

The described embodiments relate generally to reminders for mobile devices. More particularly, the present embodiments relates to smart reminders that are provided in response to trigger conditions.

BACKGROUND

Devices, such as mobile phones, provide the user with the ability to set smart reminders. Smart reminders provide a user with notifications of, for examples, tasks and errands to be completed at a later day or time. However, a reminder is often overlooked because a user has to be reminded at an opportune time or the user has to continuously look at their device in order to be reminded.

Normally, a smart reminder is provided for a particular physical location, e.g., a particular address. This precludes typical smart reminders from being used for moving objects, e.g., a car. A smart reminder can be provided to a user when the mobile device (e.g., a phone) crosses a geo-fence. But, this can be problematic as the user may not be in a position to see or use the reminder. For example, a reminder which is set to trigger when the mobile device has arrived at a user's home, may be provided to a user as soon as the user's vehicle enters their driveway. However, the user is not in a position to review the reminders at that time.

BRIEF SUMMARY

Embodiments present reminders to a user of a mobile device when the device connects with or disconnects from a vehicle. Examples of mobile devices are a phone, a tablet, and a laptop. Sensors of a mobile device can be used to determine transition of a connection state of the device with the vehicle (e.g., loss of or establishment of a communication connection from the device to a car computer). In some embodiments, smart reminder triggers can determine an appropriate time at which a reminder should be sent to a user so that the reminder is effectively used.

It can be convenient for a user to have a reminder when the user enters or exits a car. For example, a user may need to remember to get something from the trunk. Or, a user may need to be reminded to go somewhere or take something the next time the user is in the car. Accordingly, embodiments allow a user to specify a reminder for a next time that a user's mobile device establishes or breaks a connection (e.g., a wireless or wired communication connection) with a car.

Specifically, some embodiments do not automatically provide the reminder to the user based solely on a location, such as when the device crosses a geo-fence. Instead, embodiments can use other information (e.g., a connection state with a vehicle) to determine when to send the reminder. For example, the mobile device can track the connection state of the device to determine when the mobile device has entered or exited a motor vehicle.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

When a reminder is provided to a user of a device, a reminder alert or notification can be displayed on the device (e.g., on a display of a mobile phone), the device can emit a sound (i.e., an audio alarm or a phone call), or the device can vibrate in order to notify the user. Smart reminders are set to be triggered and provided to a user when the user enters or exits a vehicle. For example, a smart reminder can be set so as to trigger upon the user establishing a data connection with the vehicle. Establishing a data connection between a mobile device and a vehicle can trigger a reminder related to a user entering a vehicle (e.g., a reminder to fasten a seat belt). Also, for example, a smart reminder can be set so as to trigger when a data connection between the device and the vehicle is terminated. Termination of a data connection between the device and the vehicle can trigger a reminder related to the user exiting the vehicle (e.g., a reminder to retrieve an item from the trunk of the vehicle).

Embodiments are directed to smart reminders which provide a reminder to a user in response to triggers, therefore providing reminders at a time when they are likely to be addressed by a user (e.g., when the user enters or exits a motor vehicle).

I. Providing Reminders Based on Connection State

Embodiments provide a reminder according to a connection state between a mobile device, such as a mobile phone, and a vehicle, such as a car. The reminder can be triggered not only based on the connection state of the device, but also based on additional information indicating that the device has entered or exited the vehicle, or information indicating the vehicle has been parked at a location.

A. Method

Figure 1:
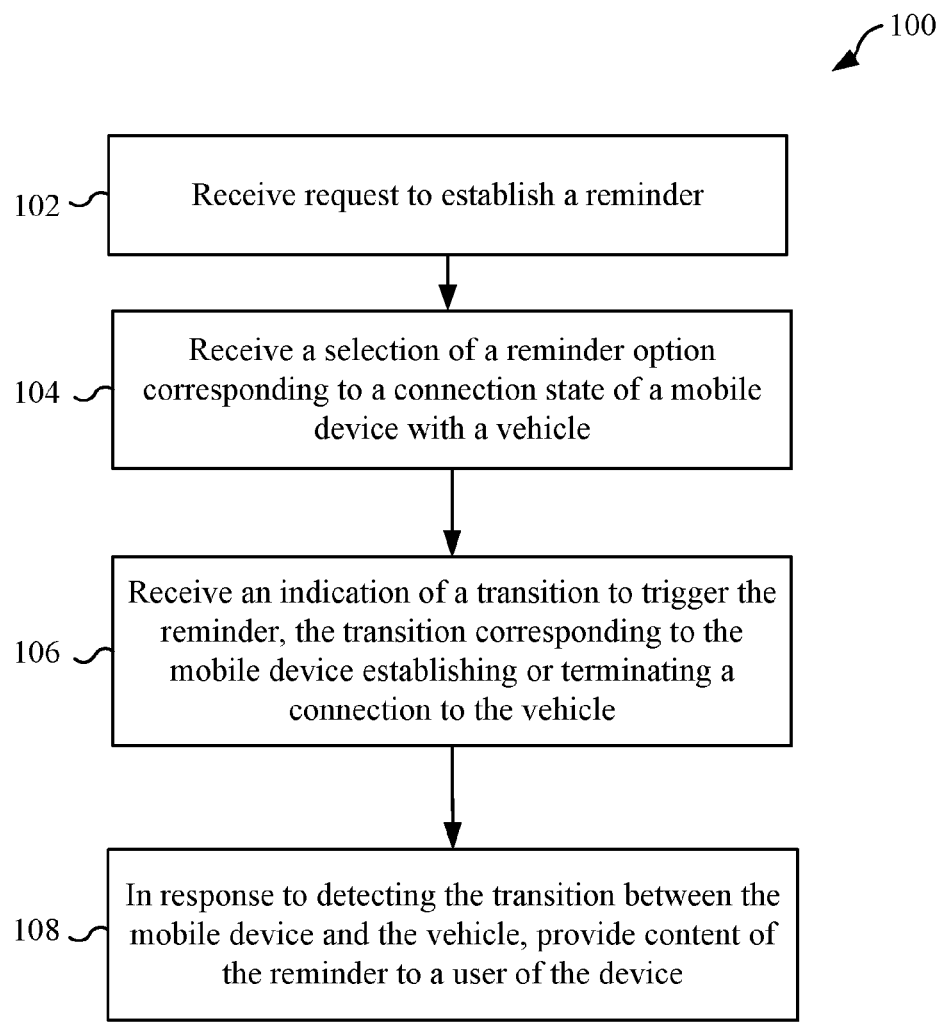
FIG. 1 is a flowchart of a method 100 for providing a reminder based on entry and exit of a vehicle according to embodiments of the present invention.

FIG. 1 is a flowchart of a method for providing a reminder according to an exemplary embodiment. Method 100, as shown in FIG. 1, can be performed by a device (e.g., a mobile device such as a mobile phone, a laptop, or a tablet).

At block 102, a user creates a reminder on their device. Specifically, the device receives a request from the user to establish a reminder associated with a vehicle (e.g., a car, a plane, a train, a ship, or another type of vehicle). The request can include a flag that indicates that the reminder is to be presented when the user enters the vehicle or exits the vehicle. In certain embodiments, the request can also include a flag indicating that sensor information (e.g., motion or communications connectivity) is to be used to determine when to provide the reminder to the user.

The reminder can be created via, for example, voice activation or by entering the reminder on a user interface. Although voice activation and a user interface are described, the embodiments are not limited to these examples. The reminder can be based on entry and exit of one or more specific vehicles (e.g., a vehicle that the mobile device has previously connected to).

At block 104, the device receives a selection of a reminder option corresponding to a connection state of the device with a vehicle. Block 104 can comprise receiving a selection of a reminder option corresponding to the device establishing a communications connection with a processor of the vehicle. For instance, a reminder option corresponding to the device establishing a wireless communication connection (e.g., a Bluetooth connection) to a processor of a motor vehicle can be selected. Such a reminder option can be set for a reminder to be presented to a user entering a car. The content of such a reminder can include, for example, "Fasten seatbelt when I get in the car."

Also, for example, block 104 can include receiving a selection of a reminder option corresponding to the termination of a wired or wireless communications connection between the device and a processor of the vehicle. In this example, the reminder option can correspond to the user exiting a car. The content of such a reminder can include, for example, "Get bag from trunk of car." In embodiments where the vehicle is a passenger bus, plane, ship, or train, the content of such a reminder can include "Get luggage from overhead compartment."

At block 106, an indication of a transition to trigger the reminder is received. As shown in FIG. 1, the transition can correspond to the mobile device establishing or terminating a connection to the vehicle. For example, connection and disconnection of the device to a processor of the vehicle can be monitored and used as the indication of a transition to trigger the reminder. In this example, connection or disconnection of the mobile device from a Bluetooth device of the vehicle or WiFi network associated with the vehicle can be used to detect whether a connection or disconnection occurs. In example embodiments where the vehicle is a bus, train, ship, or plane, termination of a connection to a WiFi network associated with such a vehicle can be used to trigger a reminder whose content includes "gather personal belongings from seatback pocket."

The mobile device can include network connectivity circuitry. Such circuitry can include sensors which can be monitored and fed into a state engine (which may involve various classifiers) that detect a change in a connection state, e.g., that the device has established (or lost) a connection with a vehicle. The current state of the device with respect to the vehicle (e.g., inside a stationary vehicle, inside a moving vehicle, outside of a parked vehicle) can also be determined based on measured values from one or more sensors of the device. Monitoring can also be performed at a server that is in communication with the device. For example, monitoring can be performed by a vehicle system such as a vehicle navigation system.

At block 108, content of the reminder is provided to a user of the device in response to detecting a transition between the mobile device and the vehicle. For example, if the device has established a connection with a vehicle or broken a connection with a vehicle, content of a corresponding reminder is presented to the user. The content can be textual content displayed on a display of the device (e.g., "get bag out of trunk") or audio content played via a speaker of the device. Block 108 can include providing one of an audio alert, text content (e.g., "fasten seat belt), an image, a video, and an audio message. The audio message can include a voice recording (e.g., a message with the audio content of the reminder).

In some embodiments, block 108 further includes determining, using a sensor of the device, if the device has entered an opportune mode for presenting the reminder according to the state of the device. The device has entered an opportune mode if there is additional information indicating that the device has arrived and settled at a particular location or that there is conservative entry of the device. Examples of opportune modes, conservative entry of a device, and determining that a device has arrived and settled are discussed in U.S. Provisional Application No. 62/171, 925, filed Jun. 5, 2015, entitled "Smart Location-Based Reminders" by Adler et al., the disclosure of which is incorporated by reference for all purposes.

In some embodiments, if there is no information indicating that the device has more than merely transitioned to connection state, then the reminder may not be provided to the user at block 108. That is, the smart reminder may not be triggered merely by a establishing or terminating a connection to a vehicle, but additional information is obtained. For example, block 108 can further include using motion activity to determine when the device has transitioned from a sedentary state (e.g., mobile device placed in car device holder after the user entered the car) to a dynamic state, such as walking or running (e.g., with a user that has exited a parked car). Further, if the mobile device is in a static state (e.g., device is sitting in a user's car) and then the device is moved (e.g., beyond a threshold), it can be determined that the device is picked up, and thus confirming that the user has exited the car and that it is an opportune time to trigger a reminder.

Responsive to detecting the transition between the device and the vehicle, block 108 can include identifying the reminder and providing the content of the reminder to the user. For example, the user may receive a notification of the reminder, such as a sound alert, a text message, a voice message, an e-mail, or any combination of notifications. In some implementations, the notification can be generated by can application running on the device, e.g., an alarm application or a reminder application. A kernel, other system routine, or other application can receive the notification from such an application.

B. System

Figure 2:
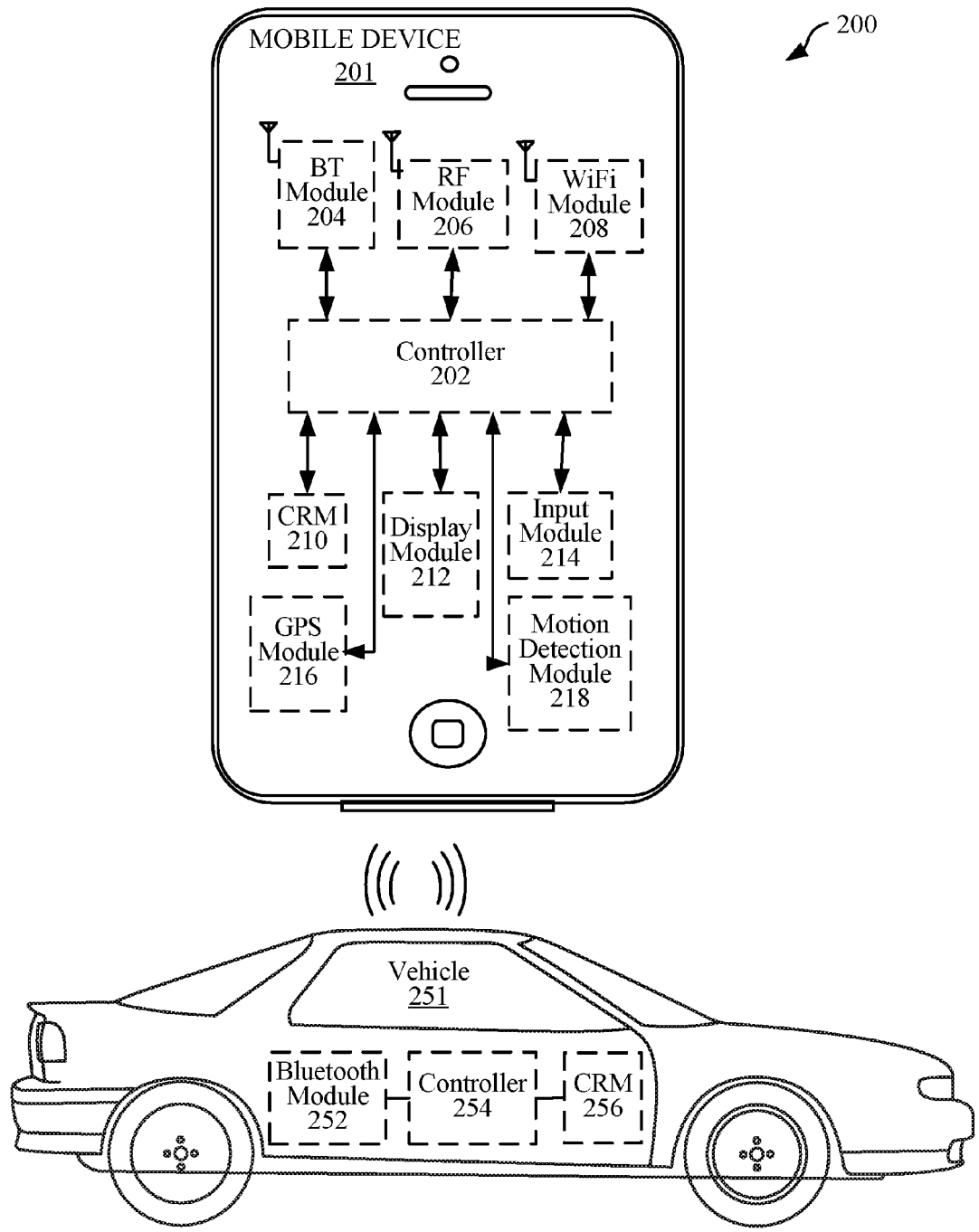
FIG. 2 illustrates a system including a mobile device and a vehicle according to embodiments of the present invention.

FIG. 2 shows a high-level block diagram of a system 200. It will be further appreciated that the devices shown in FIG. 2 are illustrative and that variations and modifications are possible. System 200 can include a mobile device 201 and a vehicle 251. While vehicle 251 is depicted as a car in the example of FIG. 2, vehicle 251 can be any type of vehicle that mobile device can establish a connection with. For example, vehicle 251 can be a bus, plane, boat, ship, train, or any other type of vehicle that a user of mobile device 201 can enter and exit.

Mobile device 201 can include a controller 202, a Bluetooth module 204, an RF module 206, a WiFi module 208, a computer-readable medium (CRM) 210, a display module 212, an input module 214, a global positioning system (GPS) module 216, and a motion detection module 218. In some embodiments, mobile device 201 can include additional modules, such as battery modules, device orientation modules, magnetometer modules, three-dimensional gyroscope modules, connector modules, audio modules, three-dimensional video processing modules, acceleration detection modules, camera modules, and/or the like. In some embodiments, mobile device 201 can be a sufficient size, dimension, and weight to enable the device to be easily moved by a user. For example, mobile device 201 can be pocket size.

Controller 202, which can be implemented as one or more integrated circuits, can control and manage the overall operation of mobile device 201. For example, controller 202 can perform various tasks, such as retrieving various assets that can be stored in CRM 210, accessing the functionalities of various modules (e.g., interacting with other Bluetooth enabled devices via Bluetooth module 204), executing various software programs (e.g., operating systems and applications) residing on CRM 210, and so on. In some embodiments, controller 202 can include one or more processors (e.g., microprocessors or microcontrollers) configured to execute machine-readable instructions. For example, controller 202 can include a single chip applications processor. Controller 202 can further be connected to CRM 210 in any suitable manner.

Bluetooth module 204 can include any suitable combinations of hardware for performing wireless communications with other Bluetooth-enabled devices and allows an RF signal to be exchanged between controller 202 and other Bluetooth enabled devices. In some embodiments, Bluetooth module 204 can perform such wireless communications according to Bluetooth Basic Rate/Enhanced Data Rate (BR/EDR) and/or Bluetooth Low Energy (LE) standards. The Bluetooth protocol, in general, enables point-to-point wireless communications between multiple devices over short distances (e.g., 30 meters). Bluetooth has gained widespread popularity since its introduction and is currently used in a range of different devices. In order to allow Bluetooth to be used in a greater variety of applications, a low energy variant of the technology was introduced in the Bluetooth Core Specification, Version 4.0. Bluetooth Low Energy (LE), in general, enables devices to wirelessly communicate while drawing low amounts of power. Devices using Bluetooth LE can often operate for more than a year without requiring their batteries to be recharged.

For example, Bluetooth module 204 can include suitable hardware for performing device discovery, connection establishment, and communication based on only Bluetooth LE (e.g., single mode operation). As another example, Bluetooth module 204 can include suitable hardware for device discovery, connection establishment, and communication based on both Bluetooth BR/EDR and Bluetooth LE (e.g., dual mode operation). As still another example, Bluetooth module 204 can include suitable hardware for device discovery, connection establishment, and communication based only on Bluetooth BR/EDR.

RF module 206 can include any suitable combinations of hardware for performing wireless communications with wireless voice and/or data networks. For example, RF module 206 can include an RF transceiver that enables a user of mobile device 201 to place telephone calls over a wireless voice network.

WiFi module 208 can include any suitable combinations of hardware for performing WiFi based communications with other WiFi enabled devices.

Computer readable medium (CRM) 210 can be implemented, e.g., using disk, flash memory, random access memory (RAM), hybrid types of memory, optical disc drives or any other storage medium that can store program code and/or data. CRM 210 can store software programs that are executable by controller 202, including operating systems, applications, and related program code.

Software programs (also referred to as software or apps herein) can include any program executable by controller 202. In some embodiments, certain software programs can be installed on mobile device 201 by its manufacturer, while other software programs can be installed by a user. Examples of software programs can include operating systems, alarm applications, reminder applications, vehicle locator applications, productivity applications, video game applications, personal information management applications, applications for playing media assets and/or navigating a media asset database, applications for controlling a telephone interface to place and/or receive calls, and so on. For example, software programs can include an application that enables a user of mobile device 201 to receive and respond to reminders. Certain software programs can provide communication with and/or control of mobile devices, and certain software programs can be responsive to control signals or other input from mobile device 201.

Display module 212 can be implemented using any suitable display technology, including a CRT display, an LCD display (e.g., touch screen), a plasma display, a direct-projection or rear-projection DLP, a microdisplay, and/or the like. In various embodiments, display module 212 can be used to visually display user interfaces, images, and/or the like.

Input module 214 can be implemented as a touch screen (e.g., an LCD based touch screen), a voice command system, a keyboard, a mouse, a trackball, a wireless remote, a stylus, a button, and/or the like. Input module 214 can allow a user to provide inputs to invoke the functionality of controller 202. In some embodiments, input module 214 and display module 212 can be combined or integrated. For example, mobile device 201 can include an LCD-based touch screen that displays images and also captures user input. Input module 214 can be used to receive input in an application for creating reminders and setting reminder options. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

As shown in FIG. 2, vehicle 251 can include Bluetooth module 252, controller 254, and CRM 256. Bluetooth module 252 can include any suitable combinations of hardware for performing wireless communications with other Bluetooth enabled devices and allows an RF signal to be exchanged between controller 254 and other Bluetooth enabled devices. In some embodiments, Bluetooth module 252 can perform such wireless communications according to Bluetooth Basic Rate/Enhanced Data Rate (BR/EDR) and/or Bluetooth Low Energy (LE) standards. For example, Bluetooth module 252 can include suitable hardware for performing device discovery, connection establishment, and communication based on only Bluetooth LE (e.g., single mode operation). As another example, Bluetooth module 252 can include suitable hardware for device discovery, connection establishment, and communication based on both Bluetooth BR/EDR and Bluetooth LE (e.g., dual mode operation). As still another example, Bluetooth module 252 can include suitable hardware for device discovery, connection establishment, and communication based only on Bluetooth BR/EDR.

In some embodiments, vehicle 251 may have other modules, such as a navigation module, RF modules, WiFi modules, display modules, input modules, global positioning system (GPS) modules, motion detection modules, device orientation modules, magnetometer modules, three-dimensional gyroscope modules, connector modules, audio modules, three-dimensional video processing modules, acceleration detection modules, camera modules, and/or the like.

Controller 254, which can be implemented as one or more integrated circuits, can control and manages certain operations of vehicle 251. For example, controller 254 can perform various tasks, such as accessing the functionalities of various modules (e.g., interacting with other Bluetooth enabled devices via Bluetooth module 252), executing various software programs residing on CRM 256, executing various vehicle-related operations and so on. In some embodiments, controller 254 can include one or more processors (e.g., microprocessors or microcontrollers) configured to execute machine-readable instructions. Controller 254 can further be connected to CRM 256 in any suitable manner.

CRM 256 can be implemented, e.g., using a disk, flash memory, random access memory (RAM), hybrid types of memory, optical disc drives or any other storage medium that can store program code, instructions, and/or data. CRM 256 can store program code that is executable by controller 254.

It will be appreciated that mobile device 201 and vehicle 251 are illustrative and that variations and modifications are possible. For example, as noted above, although vehicle 251 is depicted as a car, vehicle 251 can be any type of vehicle that mobile device can establish a wired or wireless connection with. For instance, vehicle 251 can be a motorcycle, bus, aircraft, watercraft, train, or any other type of vehicle that a user of mobile device 201 can use. While mobile device 201 and vehicle 251 illustrated in FIG. 2 have been described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software.

C. Modules

Figure 3:
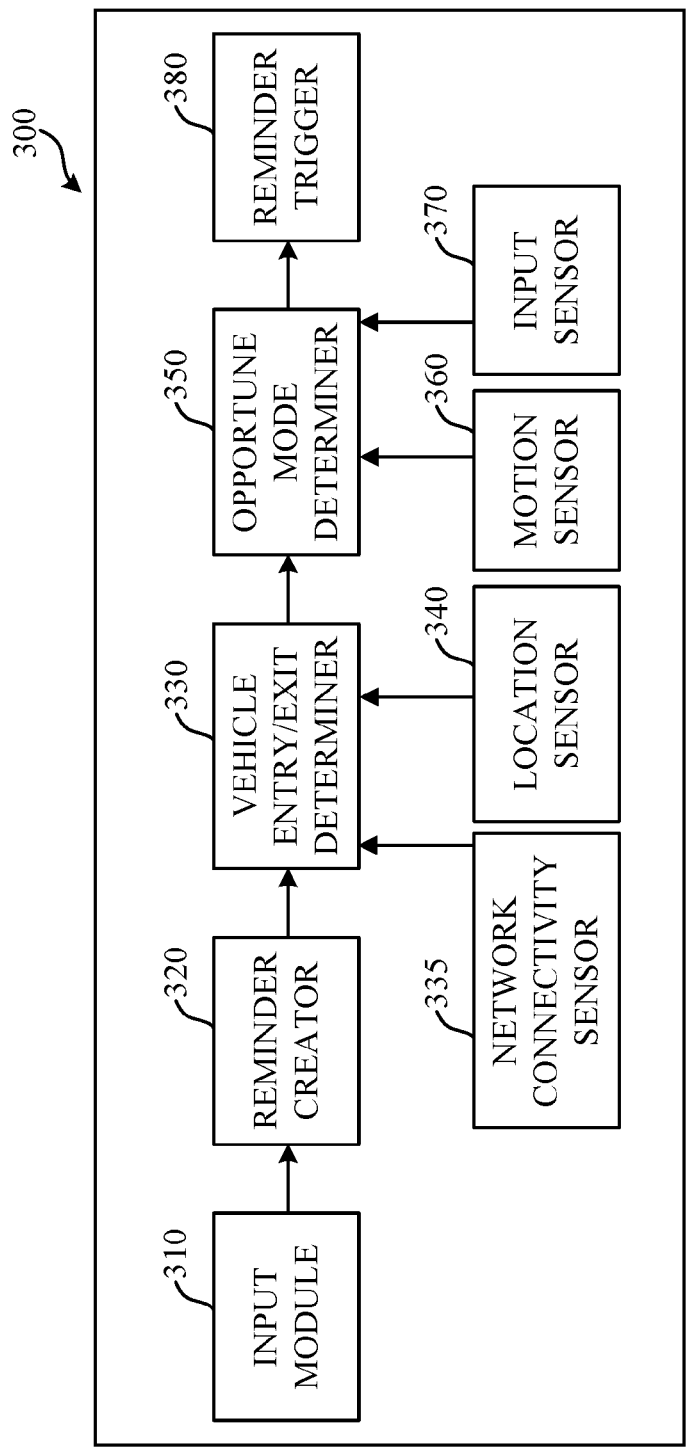
FIG. 3 is a block diagram illustrating a reminder application according to embodiments of the present invention.

FIG. 3 is a block diagram illustrating a smart reminder application according to embodiments. Specifically, FIG. 3 is a block diagram 300 illustrating a smart reminder application that can execute on a mobile device according to an embodiment. The modules depicted may be hardware or software modules for analyzing data and providing output information within the mobile device.

Information for creating a smart reminder is input in input module 310. Specifically, a user can enter information for creating the reminder, such as content directed to subject of the reminder and connection information. The connection information can include a state of a connection between the device and a processor of the car. For example, the reminder can be triggered when the mobile device detects that it has been disconnected from a Bluetooth device of the car (i.e., the device has exited the car) for triggering the reminder.

For example, a smart reminder corresponding to vehicle entry such as "Fasten seatbelt when I get in the car" can be created. The reminder includes a description and content of the reminder. Also, the reminder can include one or more reminder options. The reminder options can each correspond to a different category of reminders. One such option is the option of triggering the reminder when there is a transition or change of a connection state of the mobile device with a motor vehicle. In addition, the reminder can include be associated with a particular motor vehicle (e.g., the user's car) or a plurality of vehicles (e.g., cars the user's device has connected to recently). The vehicle information can include a general description of each vehicle, such as "my car" for the user's car and "my spouse's car" for a family member's car. In some embodiments, input module 310 allows a user to create reminders for each car that the user's device has connected to within a given time frame. For example, input module 310 can keep track of vehicles the device has been connected to (e.g., paired with via a Bluetooth connection) within the past month and can present a list of the vehicles to the user. Also, for example, input module 310 can allow the user to create reminders for vehicles the user's device has repeatedly paired with over longer time frames. For instance, input module 310 can present a list of vehicles that the user's device has been paired with more than a threshold number of times in the past year.

In addition, information as to whether an opportune mode should be entered before triggering a reminder can also be input in input module 310. Specifically, information can be entered which indicates that additional information should be determined, after the car has been entered or exited, before triggering the reminder. The reminder information can be input by, for example, an audio input or a user interface.

The reminder information which is input in input module 310 is sent to reminder creator 320. Reminder creator 320 can be a software module or other construct that can be used to initiate the creation of a smart reminder. The reminder creator 320 receives the information that is input in input module 310 for creating a smart reminder. In certain embodiments, reminder creator 320 creates reminders for each car that a user has connected to within a given time frame. For example, reminder creator 320 can keep track of vehicles the device has been connected to (e.g., paired with) within the past week and creates a reminder for each of the vehicles. In embodiments, the time frame can be selected by a user or a default, predetermined time frame.

Further, if the user has requested entry of an opportune mode before triggering the reminder, then additional information, such as movement information or device connection and disconnection information, can be included in the generated reminder. For example, the reminder can include movement information so that movement of the device after a connection has been terminated (e.g., the device has moved outside of the car) should occur before triggering the reminder.

After creation of the smart reminder in the reminder creator 320, a vehicle entry/exit determiner 330 determines whether a mobile device has entered or exited a motor vehicle. The determination can be made based at least in part on information indicating the status of a connection (e.g., a wireless or wired communication connection) between the mobile device and a vehicle. The status of the connection can be provided by a network connectivity sensor 335. Network connectivity sensor 335 can determine whether the device is in a connected or disconnected state from a Bluetooth device of the vehicle or whether the device is connected to or disconnected state from a network, such as a cloud. Network connectivity sensor 335 can also determine a state of a network connection. For example, network connectivity sensor 335 can determine that the connection state is one of one of disconnected, transitioning from a disconnected state to a connected state, connected, or transitioning from a connected state to a disconnected state.

As shown in the example of FIG. 3, vehicle entry/exit determiner 330 can also receive location information from a location sensor 340. Location sensor 340 can provide location information of the mobile device to the vehicle entry/exit determiner 330 to supplement the connection state information. Specifically, the location sensor 340 provides, for example, GPS information of the mobile device. Such location information can be used in conjunction with a connection status to confirm that the mobile device has entered into or exited from a vehicle.

If vehicle entry/exit determiner 330 determines that the mobile device has entered or exited a vehicle, which was designated using input module 310, then reminder trigger 380, can trigger presentation of a reminder. In the example embodiment depicted in FIG. 3, after vehicle entry/exit determiner 330 determines that the mobile device has entered or exited the vehicle, an opportune mode determiner 350 can optionally determine whether additional information is provided. Specifically, in some embodiments, opportune mode determiner 350 may determine whether the device has been removed from a vehicle (e.g., after a car has been parked and the device is no longer connected to the car).

In certain embodiments, opportune mode determiner 350 can determine whether there is additional information indicating that the device has arrived and is settled at the designated location based on information from, for example, a motion sensor 360 or an input sensor 370.

Although a network connectivity sensor 335, a location sensor 340, a motion sensor 360, and an input sensor 370 are described, one or more sensors of the device can be used to determine a state of the device. Specifically, sensors can be used to determine that the device has entered or exited a vehicle. For example, sensors can detect vibration of the vehicle's engine to know the vehicle is moving or use a barometer to detect pressure change once the vehicle door closes to determine that the device has entered the vehicle. In some embodiments, various sensors can be used to determine whether the device has entered an opportune mode. Measurements from various sensors can be used by opportune mode determiner 350 to determine a state of the device and the measurements can be sent to state classifiers.

Motion sensor 360 determines whether there is movement of the device after the device has entered or exited the vehicle. Specifically, motion sensor 360 determines whether there is a change in the motion state of the device. For example, motion sensor 360 detects whether the device has changed from an immobile state (e.g., remaining in a fixed position in a car) to a mobile state (e.g., carried around by a user after exiting the car).

Input sensor 370 determines whether there is input activity at the mobile device. For example, input sensor 370 can determine whether a user input has been made on the device. For instance, input sensor 370 can be used to determine that the device transitioned from a sleeping mode to an awake mode due to user input received at the device.

Reminder trigger 380 receives information from vehicle entry/exit determiner 330 (optionally via opportune mode determiner 350) as to whether a reminder should be triggered. If vehicle entry/exit determiner 330 determines that the device has entered or exited the vehicle, then reminder trigger 380 triggers the smart reminder. Optionally, if opportune mode determiner 350 determines that the device has entered an opportune mode, based on analyzing the information from motion sensor 360 and/or input sensor 370, then the reminder trigger 380 will trigger the smart reminder.

The elements described above are merely examples of the elements that are used to determine whether to trigger a smart reminder and elements can be removed or added and the order of the elements can be changed as would be clear to one of skill in the art. For example, as noted above, opportune mode determiner 350 is optional and can be removed the application shown in FIG. 3. In this example, reminder trigger 380 receives information directly from vehicle entry/exit determiner 330.

D. Vehicle State Determination

In some embodiments, a mobile device can continuously or periodically determine whether a connection state between a mobile device and a vehicle is in a disconnected state, a connected state, transitioning from a connected state to a disconnected state, or transitioning from a disconnected state to a connected state. For example, as the user of vehicle 251 operates the vehicle (e.g., in order to locate a parking spot), mobile device 201 can use network connectivity sensor 335 to continuously monitor the connection state to determine whether the device is disconnected from the vehicle after the vehicle has been parked. Mobile device 201 can also determine the state of vehicle 251 in any suitable manner and using any suitable information. For instance, mobile device 201 can use network connectivity sensor 335, location sensor 340, motion sensor 360, to determine whether vehicle 251 is in a transit state, a parked state, or an undetermined state. For example, a mobile device can determine that the car is in a transit or parked state by analyzing various input parameters that are detectable by the mobile device and making inferences about the state of a vehicle associated with a user of the mobile device (e.g., a passenger or operator of the car). Input parameters can include any suitable parameter that might give an indication of the state of the mobile device and/or vehicle associated with a user of the mobile device, including network connectivity (or lack thereof), physical sensor data, and external data or input. For instance, the input parameters can include parameters provided by network connectivity sensor 335, location sensor 340, and motion sensor 360.

Figure 4:
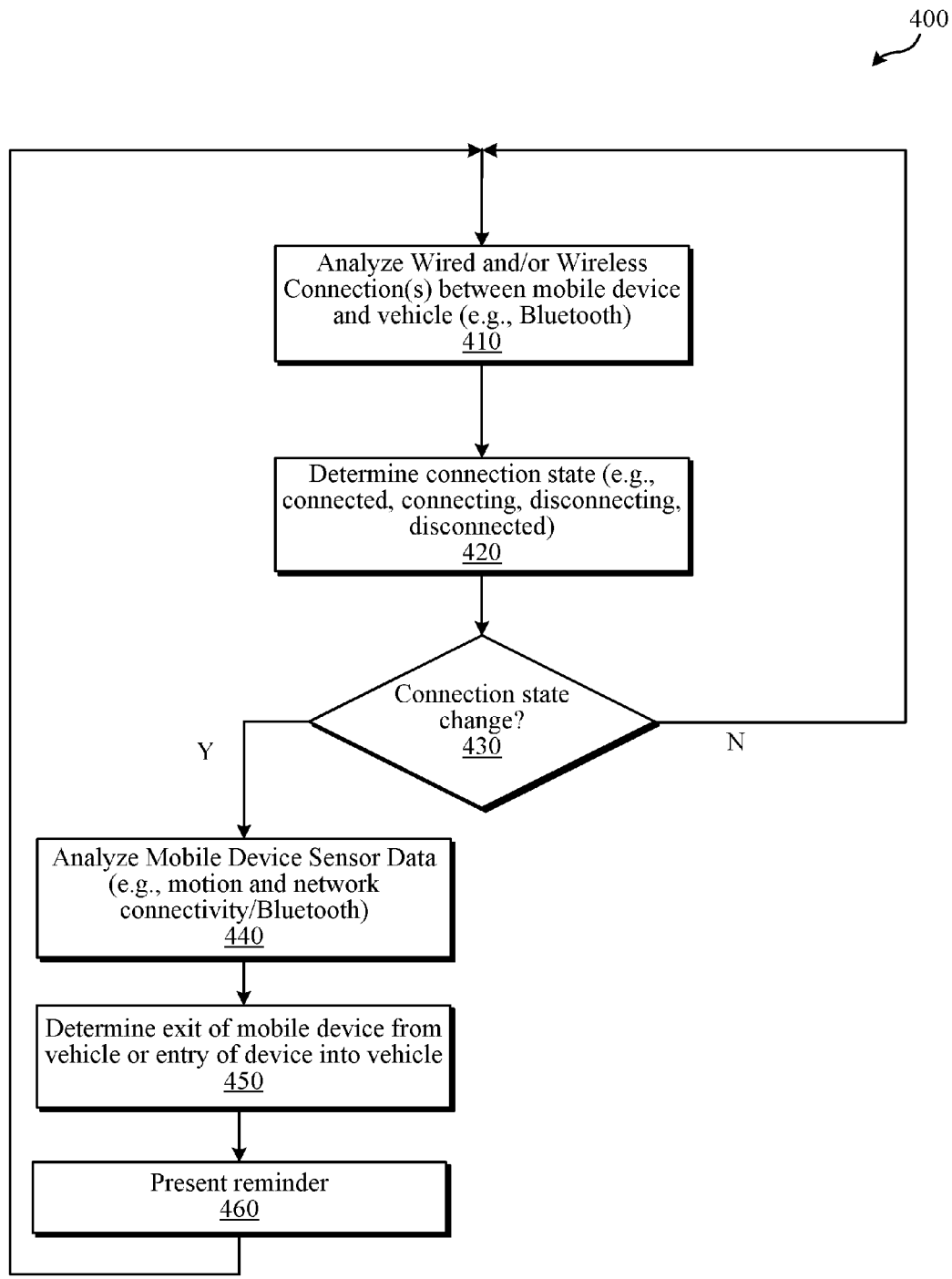
FIG. 4 is a flow diagram of a process 400 usable by a mobile device to determine a state of a connection between the mobile device and a vehicle according to embodiments of the present invention.

FIG. 4 illustrates a flow diagram of a process 400 usable by a mobile device to determine a state of a connection between the mobile device and a vehicle. For instance, process 400 can be used to determine a state of a wireless Bluetooth connection between a mobile device and a car. Process 400 can be used to determine that the connection state is one of disconnected, connected, transitioning from a connected state to a disconnected state, or transitioning from a disconnected state to a connected state. At a high-level, process 400 analyzes various parameters that can indicate whether the mobile device in a vehicle or not (see, e.g., blocks 410 and 440). One or more of these steps are optional and may be performed in any order.

At block 410, the mobile device analyzes whether one or more wired or wireless connections exist between the mobile device and the vehicle. Parameters received at block 410 can be analyzed and weighted to provide an overall confidence score for whether the mobile device is connected to a processor of the car or not. For instance, block 410 can comprise analyzing a wireless Bluetooth or WiFi connection between the mobile device and the vehicle. In some embodiments, block 410 can comprise analyzing a wired connection between the mobile device and a processor of the car (e.g., when the mobile device is docked). For example, the mobile device can detect that it is connected to power and that it is connected to a car processor. A wired connection can be any suitable physical connection between the mobile device and the vehicle, such as a 40-pin connector, a Lightning cable, a USB cable, an Ethernet cable, a docking station, and the like. The mobile device and the vehicle can be considered connected when the mobile device is docked, mounted, or otherwise physically connected to the car.

At block 420, a connection state is determined based on the parameters received at block 410. As shown, block 420 can determine that the connection state is one of connected, connecting, disconnecting, or disconnected. For example, block 420 can determine that the current connection state is connected when the analysis performed at block 410 indicates that the mobile device is connected to the vehicle via a Bluetooth connection.

At block 430, in some embodiments, if the connection state determined at block 420 differs from a previously determined connection state, then control is passed to block 440. If the connection state is unchanged as compared to the previously determined connection state, control is passed back to block 410, where the mobile device can continue to monitor the connection state.

At block 440, the mobile device can analyze sensor data on the mobile device. The sensor data can include motion sensor data and network connectivity sensor data usable to make an inference that the device has entered or exited the vehicle. If the mobile device and the vehicle are in communication with each other (e.g., the connection state is connected), the mobile device can receive vehicle state information or other information directly from the vehicle. In block 440, motion sensor data can be analyzed in conjunction with network connectivity sensor data to determine that the device has transitioned from a sedentary state (e.g., docked in the vehicle) to a dynamic state (e.g., with a user that is walking outside of the vehicle) after the connection state changed from connected to disconnected.

At block 450, it is determined that the device has entered or exited the vehicle. The determination can be based on the connection state determined at block 420 and the sensor data analyzed at block 440. For example, block 450 can determine that the device has entered the vehicle if the connection state is one of connecting or connected, and if the mobile device sensor data indicates that the device is with a user that is sedentary or in the vehicle as it is being driven.

At block 460, if it is determined that the device has entered or exited the vehicle, the content of a reminder associated with vehicle entry or exit is presented. For example, if it is determined that the device has entered a car, block 460 can display a visual reminder to a user to "Fasten your seatbelt."

The following subsections describe how a mobile device can automatically determine that a car associated with a mobile device is parked. In certain embodiments, the methods described can be combined or used separately. Subsection E describes certain embodiments where the connection/disconnection state between the mobile device and the vehicle can be used to determine whether the car is in a transit state, a parked state, or an undetermined state. Subsection F describes certain embodiments where mobile device sensor data parameters and/or other input can be used to determine whether the car is in a transit state, a parked state, or an undetermined state.

E. Connection and/or Disconnection Between Mobile Device and Vehicle

As described, various entities (e.g., mobile devices, vehicles) described herein can communicate over one or more wireless connections. In some embodiments, mobile device 201 can determine the state of a vehicle 251 based on the mobile device's connection with vehicle 251. Illustratively, mobile device 201 and vehicle 251 can establish a connection with one another (e.g., a Bluetooth or Bluetooth LE connection). During operation, mobile device 201 can periodically or continuously monitor its connection with the vehicle. If the connection is terminated or the vehicle is no longer responsive over the connection, mobile device 201 can determine that the vehicle has been turned off (e.g., both the vehicle's engine and electrical system have been shut down). Based on this information, mobile device 201 can determine that the vehicle is currently in a parked state. Conversely, mobile device 201 can determine that the vehicle is currently in a transit state based on a connection with the vehicle 251. In some embodiments, when the vehicle transitions from a transit state to a parked state, a smart reminder can be triggered.

Many wireless communication standards exist for enabling different devices to communicate. The following description primarily refers to communication using Bluetooth and/or Bluetooth LE connections. However, one skilled in the art will appreciate that the techniques disclosed in this specification are equally applicable to other types of connections, such as wired and other types of wireless connections (e.g., near field communications, WiFi, infrared communication, or the like).

In general, Bluetooth allows voice and data communication between various devices without a physical cable, and instead uses frequency-hopping spread spectrum technology. Currently, Bluetooth exists in two variations: standard Bluetooth (e.g., Bluetooth Basic Rate/Enhanced Data Rate) and Bluetooth Low Energy (LE). As a general matter, Bluetooth LE operates similarly to standard Bluetooth, except that those interfaces using Bluetooth LE consume less power and operate with lower latency. Bluetooth LE, in addition, uses a different a set of channels from standard Bluetooth. In particular, Bluetooth LE operates over 40 two-MHz-wide channels rather than the 79 one-Mhz-wide channels used in standard Bluetooth. While Bluetooth and Bluetooth LE are not designed to be compatible with one another, many Bluetooth interfaces support both variations (e.g., the modules can operate in dual mode).

At the most basic level, devices supporting Bluetooth and/or Bluetooth LE can establish wireless connections with neighboring Bluetooth and/or Bluetooth LE devices using point-to-point connections. In particular, a master-slave structure can be established where one master device communicates with at least one slave device in a network group called a piconet.

Typically, in order for two Bluetooth devices to establish a connection, the devices must be paired through a connection procedure. The connection procedure is frequently triggered automatically the first time a device receives a connection request from a device with which it is not yet paired. During the pairing process, the mobile device and the car system can exchange pairing information, including device identifiers. Device identifiers can be used to differentiate between devices when connecting to different or multiple devices. Device identifiers can also be used to identify the manufacturer, product ID, product version, and the like. Initial pairing may require user intervention, e.g., to confirm that pairing is desired or to enter an authentication code. After a pairing has been established, parameters associated with the pairing can be remembered (e.g., stored) by the devices and a secure connection can be established. Following pairing, the paired devices can reconnect to each other without user intervention. If desired, the pairing relationship can later be removed by a user.

In some embodiments, mobile device and car systems automatically connect when they are powered on and within an operating range (e.g., a connected state or transitioning from a disconnected state to a connected state). For instance, various Bluetooth devices can have maximum operating ranges of 1 meter, 10 meters, 100 meters, etc., although real-world operating ranges may be more or less.

In some embodiments, the connection between the mobile device and the car system is broken (i.e., disconnected state or transitioning from a connected state to a disconnected state). In some embodiments, mobile device and car systems automatically disconnect when at least one of the two are powered off. In some embodiments, mobile device and car systems automatically disconnect when the distance separating the two devices is greater than an operational range. In some embodiments, the termination of the connection can be abrupt or without warning.

In certain embodiments, the connection state between the mobile device and the car may be a connected state, a connected-to-disconnected transition state, a disconnected state, or a disconnected-to-connected transition state. The connection state between the mobile device and the car can indicate (alone or in combination with other factors) the car is in a transit state, a parked state, or an undetermined state. Based on the connection state and the indicated car state, it can be determined that the mobile device is entering the car. For example, if the connection state between the mobile device and the car is the disconnected-to-connected transition state (e.g., a new Bluetooth connection is being established), and the car state is transitioning from a parked state to a transit state, it can be determined that the mobile device has entered the car. Also, for example, if the connection state between the mobile device and the car is the connected-to-disconnected transition state (e.g., an existing Bluetooth connection is being terminated), and the car state is the parked state, it can be determined that the mobile device has exited the car.

When a mobile device and car system are connected, this can be an indication that the user is entering the car, in the car, or near the car. It can also be an indication that the car is in a transit state. A recent connection event (e.g., a transition from disconnected to connected) between the mobile device and the car system can also be an indication of a transit state, or soon-to-be transit state. For example, when the mobile device transitions from a disconnected state to a connected state with the car system, the user may be entering the car, turning it on, and getting ready to drive.

When a mobile device and car system are disconnected, this can be an indication that the car (in which the user is a passenger or driver) has parked. A disconnection event (e.g., a transition from a connected state to a disconnected state) can also be an indication that the mobile device and user are no longer near the car; for example, the mobile device is outside the operating range of the wireless technology.

In some embodiments, a mobile device can detect a connection state change. Based on the connection state change, the mobile device can determine whether the mobile device is in a car and/or whether the car is in a transit state. Based on the connection state change, the mobile device can determine whether the mobile device is away from a car and/or whether the car is in a parked state. When it is determined that a car transitions from a transit to a parked state, the mobile device can take various actions, as described herein, including providing a reminder.

In some embodiments, the car system can be a car stereo system, navigation system, or other system on the car. In some embodiments, the car system can be a peripheral that is coupled to the car (e.g., a dongle, key fob, or other electronic device that is affixed or connected to the car). For example, older cars may enable the described functionality by plugging in a small device to car power or by placing a battery powered device in or on the car (e.g., a Bluetooth Low Energy dongle).

In some embodiments, a connection (e.g., WiFi) can be established between the mobile device and the car system through a login process. For example, when connecting to a car WiFi network, a network identifier (SSID) may be required and a password/passcode (e.g., a WEP password) may be required. Although Bluetooth and WiFi are described here, any suitable short- or medium-range wireless connection can be used. For example, the connection may use a car-specific communication protocol.

In some embodiments, a wired connection can be established between the mobile device and the car system (e.g., when the mobile device is docked). For example, the mobile device can detect that it is connected to power and that it is connected to a car system or a particular car system. Likewise, the mobile device can detect that is no longer connected to power or when the wired connection disconnects from a car system or a particular car system. A wired connection can be any suitable physical connection between the mobile device and the car system, such as a 40-pin connector, Lightning cable, USB cable, Ethernet cable, docking station, and the like. The mobile device and the car can be considered connected when the mobile device is docked, mounted, or otherwise physically connected to the car.

The connection and/or disconnection between a mobile device and vehicle can be used in combination with other input or data to make inferences about the state of a car associated with a user of the mobile device. Some of these embodiments are described in the following subsections and it is appreciated that they could be combined with the connection/disconnection state interferences described above.

F. Inferential Determination of Parked State

In some embodiments, contextual information can be used to make inferences and determine whether the car is in a transit state, a parked state, or an undetermined state. Contextual information can include any suitable physical sensor parameter that might give an indication of the state of the mobile device and/or vehicle associated with a user of the mobile device. Contextual information may also include navigation input, maps and business data, user-triggered input, transactional data, external data or input, and the like. This contextual information can be analyzed and used to determine the state of the mobile device and/or car. For example, the mobile device can evaluate sensor data parameters or other input to make an inference about the state of the mobile device and/or car.

Mobile device sensors that capture physical sensor data can include network connectivity sensors, GPS units, motion sensors, elevation sensors, barometric pressure sensors, audio sensors, image sensors, transactional input, and external parking location transponders/identifiers, and the like. Input to a device sensor can include any input that is measurable by a device sensor. In some embodiments, mobile device 201 can determine the state of vehicle 251 and the connection state with vehicle 251 based on information collected and/or received from various modules embedded in the mobile device.

In some embodiments, GPS units can be used for location- and/or speed-based inferences. Modern GPS units can provide increasingly precise geographic coordinates and, in some cases, current speed information. The GPS location of a mobile device can be used to determine that a car associated with a mobile device user is parked (or in transit). For example, mobile device 201 can determine that the vehicle is currently stationary based on information collected by a GPS module embedded in the mobile device. In particular, mobile device 201 might determine, based on the coordinates provided by a GPS module, that the mobile device has not changed location for a specific period of time (e.g., 40 seconds, 1 minute, etc.). Based on such a determination, mobile device 201 can determine that vehicle 251 is currently in a parked state.

In some embodiments, a GPS location can indicate the position of the mobile device (car) relative to a road or sidewalk. For example, if the GPS location indicates that the mobile device is on the side of the road, on a sidewalk, or adjacent to the road, the mobile device can infer that the car is parked. For example, the car could be parked in a street parking spot, or the user could be walking on the sidewalk after parking, or the car could be parked at a parking lot just off the road.

Certain sensors can provide current speed information (e.g., GPS, accelerometers, etc.). The current speed of the mobile device and/or changes in relative speed of the mobile device can be indicative of the car being in a parked state or a transit state. For example, if the current speed of a mobile device is greater than 45 miles per hour, then the mobile device is likely in a car or other motorized vehicle. In another example, if the speed measured by the mobile device was greater than 45 miles per hour followed by a much slower pace consistent with a human walking (e.g., 1-3 MPH), then it can be inferred that a car was parked and the user is walking away from the car.

In some embodiments, motion sensors such as accelerometers can indicate whether a car associated with a mobile device user is in a parked state or a transit state. Certain motion patterns, for example, may be associated with specific transit activities. For example, walking with a mobile device may generate an up-down motion with the user's gait. Riding a bicycle may generate a more circular motion when pedaling. Riding or driving in a car may generate more uniform acceleration and deceleration patterns, for example, laterally, as opposed to up and down or circular. In any event, motion data from motion sensors may be analyzed for patterns consistent with being in transit (e.g., driving a car or riding a bike) or having recently parked a vehicle (e.g., walking from the vehicle). In some embodiments, motion patterns can be used as a parameter to determine whether the vehicle is in a parked state As another example, mobile device 201 can determine that a door of vehicle 251 is currently opened based on information collected from a sensor module, a camera module, a microphone, etc. In some embodiments, a camera can be used to make inferences about whether the car is parked or not. For example, image recognition can be used to analyze an image (still or video) and determine whether the visible area is consistent with a parking spot.

In other instances, mobile device 201 can use an embedded microphone to determine whether the vehicle is parked or in transit. For example, a particular warning sound may be broadcasted by vehicle 251 when the door of the vehicle is open. Based on such a determination, mobile device 201 can determine that the vehicle is currently in a parked state. In some embodiments, the car's engine noise or vibration can be measured by sensors on the mobile device. This can indicate that the car is on or off, and based on this the mobile device can infer whether the car is in a parked or transit state.

In some embodiments, an elevation sensor can be used to measure elevation of the mobile device. If the elevation of the mobile device is higher or lower than a known elevation for a particular street location, the mobile device can infer that the car has entered a multilevel parking structure.

One having skill in the art will recognize that other sensors could be used to make inferences about whether a car is parked or in transit.

Other input and parameters that can be used to infer the state of a vehicle associated with a user of a mobile device includes information from a navigation unit (on the mobile device or part of a car navigation system), map and business data, transactional data, and the like. In some embodiments, the other types of input can be used in combination with other information, such as location data.

In some embodiments, maps and business data (locally stored on the device or in the cloud) can be used to make inferences about whether a car is in a parked or transit state, and whether the device has exited or entered the car. For example, business data may indicate whether a given location is a common place to park or if the location is a designated parking area (e.g., a parking lot or structure). Business data may also indicate whether a given location is more likely to be "passed through" without exiting the car rather than stopped at (e.g., drive through windows near a freeway). Business data may indicate whether the popularity of a given location by time, day of week/month, or season. The likelihood of a user parking and exiting a car at a given location may be calculated using map and business data.

In some embodiments, a GPS location can indicate that the mobile device is at a known parking area (e.g., parking garage or lot). When the GPS location is within a threshold distance of a known parking location, the mobile device can infer that the car is being parked or about to be parked. In some embodiments, a GPS location can indicate that the mobile device is near an area with a high parking density (e.g., based on maps and business data) and therefore it is an area that the car is more likely to be parked. In some embodiments, a GPS location can indicate that the mobile device is not near any known parking areas and infer that the car is not parked or parking.

In some embodiments, a navigation or maps app can be used to determine the state of the vehicle and to determine if the device has entered or exited the vehicle. For example, a navigation app running on the mobile device can be used to get directions to a user-specified destination, for example, turn-by-turn driving directions. When the user reaches the destination, the navigation sequence may end (e.g., the app may indicate that the user has arrived at the destination, cease providing directions, and/or exit the application). Scenarios where the user has arrived at the destination (or is near the destination) can be referred to as end of navigation scenarios. Inferences can be made based on end of navigation scenarios using data from the navigation or maps app. For example, when the location is near the user-specified destination, the mobile device can infer that the mobile device user will be parking and exiting the vehicle soon.

In some embodiments, transactional input (e.g., purchases or reservations made with the mobile device) may be used to infer the state of a car. For example, parking may be paid for using the mobile device or proof of payment may be provided using the mobile device upon arrival at a parking area. Knowing that the mobile device has arrived at a parking area based on transactional input, the mobile device can make an inference regarding parking status and to determine that the device is about the exit the vehicle.

In some embodiments, mobile device 201 can determine the state of vehicle 251 based on state information received directly from the vehicle. Modern cars often have advanced computer systems that monitor and record various aspects of the operation of the car. In some embodiments, a signal received from such a car system can be used to determine whether the car is in a transit state, a parked state, or an undetermined state. For example, car computer systems may detect when a door is open and display a message or "door open" warning on the dashboard. Such a "door open" message can indicate that the device is entering or exiting the car.

In another example, car computer systems may detect whether the transmission is in Park, Drive, Reverse, and/or whether the brake pedal, gas pedal, or parking brake is being applied. There are many other examples of car sensors that are connected to the car computer system, including key in on/off position, key in/out of ignition, whether seats are occupied, keyless entry sensor, the operational state of certain vehicle components, the length of time the vehicle has been in a certain operational state, length of time the vehicle has been stationary, and the like.

Car status information may be communicated to the mobile device using a wired or wireless connection. Upon receipt of car status information from the car computer system, the mobile device can determine whether the car is in a transit state, a parked state, or an undetermined state. In some embodiments, the signal with car status information can explicitly inform the mobile device that the car is parked. In some embodiments, the signal with car status information can be used to make an inference that the car is parked according to the disclosure herein.

Illustratively, mobile device 201 and the vehicle can establish a connection with one another (e.g., a Bluetooth or Bluetooth LE connection). After establishing the connection, mobile device 201 can periodically or continuously receive state information from the vehicle. Mobile device 201 can receive, from the vehicle, the current state of the vehicle's engine, the position of the transmission of the vehicle, etc. During operation, mobile device 201 can receive information indicating that the vehicle's engine is currently turned off and/or the vehicle's transmission is in park. Based on this information, mobile device 201 can determine that the vehicle is currently in a parked state. In other embodiments, vehicle 251 can directly indicate to mobile device 201 that the vehicle is currently parked.

II. Methods for Creating and Providing Reminders

As discussed above with respect to FIG. 1, it can be determined whether a device has entered or exited a vehicle using, for example, the status of a Bluetooth connection between the device and the vehicle. In certain embodiments, the reminder may not be triggered merely when the user enters or exits a vehicle. Specifically, the reminder is triggered when it is determined that the device has entered an opportune mode for receiving the reminder.

Figure 5:
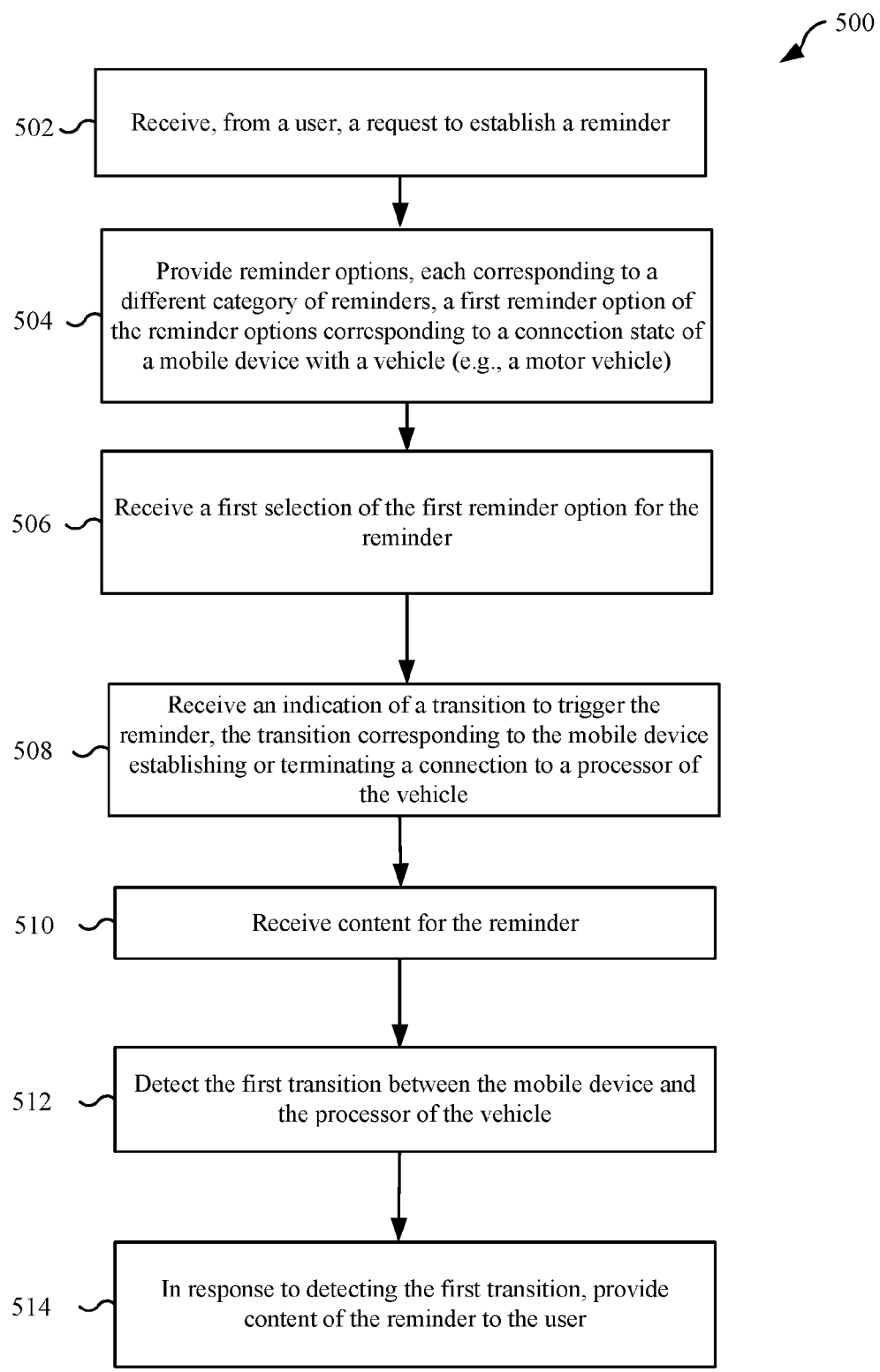
FIG. 5 is a flowchart of a method 500 for providing reminders based on a connection state of a mobile device with a vehicle according to embodiments of the present invention.
Figure 6:
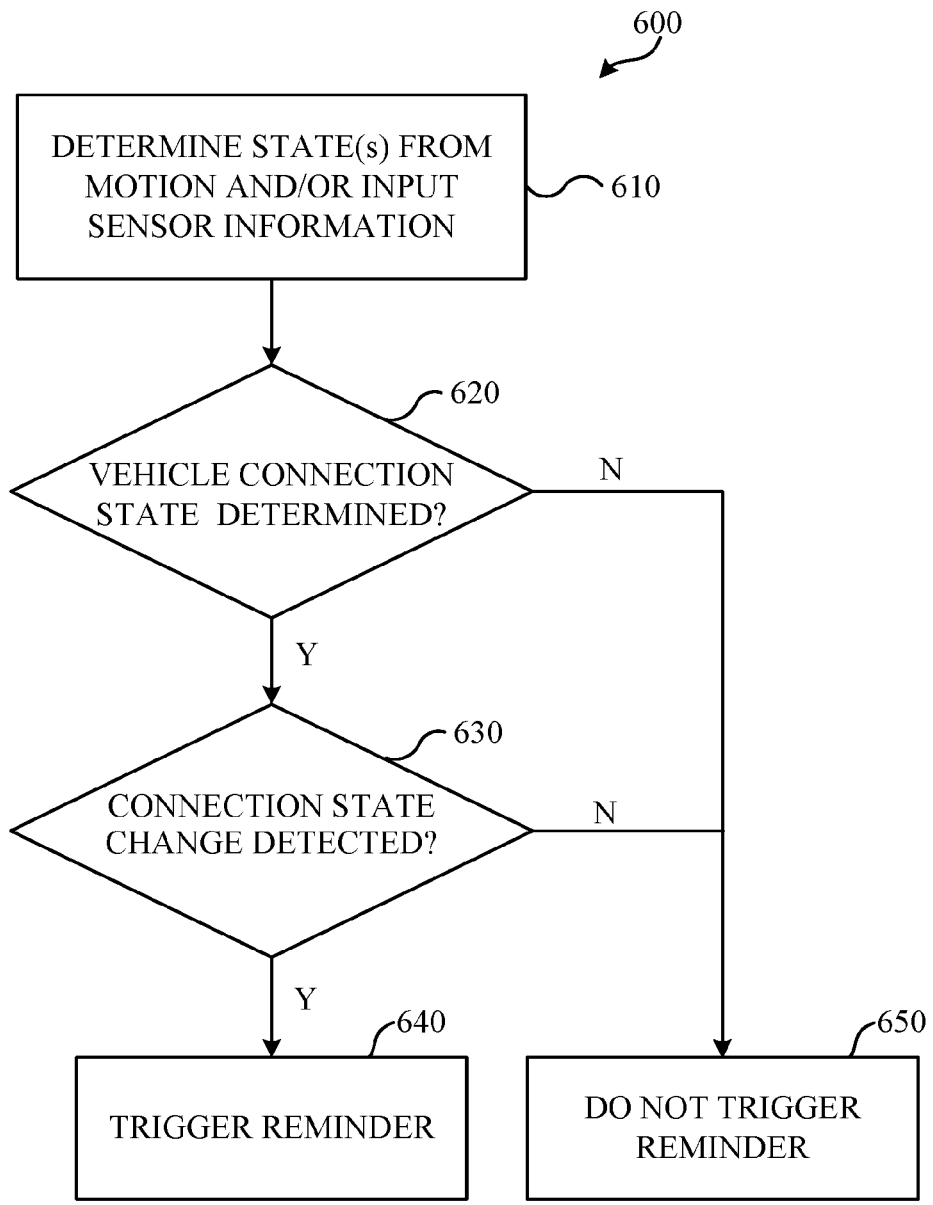
FIG. 6 is a flowchart describing a method 600 for determining entry or exit of a vehicle according to embodiments of the present invention.

FIGS. 5 and 6 describe blocks 102-108 of FIG. 1 in more detail. Specifically, FIG. 5 is a flowchart describing a method for providing reminders based on a connection state of a mobile device with a vehicle. FIG. 6 is a flowchart describing a method for determining entry or exit of a vehicle, and triggering a reminder based on the determination.

A. Creating and Providing Reminders

FIG. 5 is a flowchart of a method 500 for providing reminders based on a connection state of a mobile device with a vehicle according to embodiments of the present invention. Method 500 can be performed by a computing device (e.g., by a mobile device associated with a user). The user can be a passenger or operator of a vehicle.

At block 502, the device receives, from a user, a request to establish a reminder. The request can be a request to establish a reminder associated with a vehicle (e.g., a car, a plane, a bus, a train, a ship, or another type of vehicle the user is a passenger in or operator of). The request can include a flag that indicates that the reminder is to be displayed (e.g., text or image reminders) or played (e.g., audio or video reminders) for the user when the user enters or exits the vehicle. In certain embodiments, the request can also include a flag indicating that sensor information (e.g., motion and/or connectivity status) is to be used to determine when to provide the reminder to the user.

At block 504, reminder options are provided to the user. As shown, each reminder option can correspond to a different category of reminders, and at least a first reminder option of the reminder options corresponding to a connection state of a mobile device with the vehicle. For example, the connection state can be one of connecting, connected, disconnecting, or disconnected, where the connection state pertains to a Bluetooth connection between the device and the vehicle. In some embodiments, block 504 can include providing a list of one or more vehicles to which the mobile device has previously connected. For example a list of one or more motor vehicles the device has paired with in the past month can be displayed to the user so that the user may select one or more motor vehicles from the list. Block 504 can then provide reminder options to the user for each selected vehicle.

At block 506, a first selection of the first reminder option for the reminder is received. Block 506 can comprise receiving a selection of an option to trigger a reminder when the user enters or exits a particular vehicle. In some embodiments, the first reminder option can correspond to a connection state (e.g., connecting or connected) of the mobile device to any motor vehicle.

At block 508, the device receives an indication of a transition to trigger the reminder. As shown, the transition can correspond to the mobile device establishing or terminating a connection to a processor of the vehicle. For example, the transition can correspond to the device establishing or terminating a Bluetooth connection with a processor of a motor vehicle system.

At block 510, the device receives content for the reminder. The content can include text (e.g., "Get bag from trunk of car"), images (e.g., images or an animation reminding the user to fasten a seat belt), and/or audio (e.g., a recorded voice reminder to get a bag from the trunk of the car). The audio reminder content can be a sound such as a chime or alarm, or a recorded voice. The reminder can also include other content, such as, for example, a vibration (e.g., so that the device will vibrate when the reminder is triggered).

At block 512, the device detects the first transition between the mobile device and the processor of the vehicle. For example, the first transition detected at block 512 can correspond to the mobile device disconnecting from a processor of a motor vehicle system.

At block 514, the device provides the content of the reminder to the user in response to detecting the first transition. For example, block 514 can include displaying text or image reminder content on a display screen of the device. Further, for example, audio reminder content can be played via a speaker of the device or headphones connected to the device. In some embodiments, block 514 can include using a vehicle system or program (e.g., CarPlay) to provide the content of the reminder. For instance, a reminder to "Fasten seat belts" can be displayed on a screen of a vehicle after the device has connected to the vehicle. In this example, the reminder can be provided after the device is paired with the vehicle and is communicatively coupled to a vehicle system or program configured to provide content via a vehicle screen. Also, for example, audio reminder content can be played via a speaker of a vehicle audio system.

B. Triggering Reminders

FIG. 6 is a flowchart of a method 600 for determining entry or exit of a vehicle, and triggering a reminder based on the determination.

At block 610, one or more states of the device are determined from sensor information generated by sensors. A mobile device can have multiple device states, including a network connectivity state. Other states can be determined at block 610. For example, a motion state of the device and/or the vehicle can be determined to infer that the vehicle is driving, parking, or stationary/parked. The sensor information can include, for example, motion sensor information usable to determine a motion state of a mobile device. The motion state of the mobile device can be determined and monitored using sensors of the mobile device. In some embodiments, the motion state can change from one static position to another, or transition from one rate of motion (e.g., speed) to another. For example, the mobile device can determine whether the mobile device has suddenly been moved from a resting position. The mobile device can continuously determine a motion state based on motion activity (e.g., driving, semi-stationary, stationary, parked, walking, and running). A motion state is an example of a device state that can be determined at block 610.

By using the sensor information, connection and motion states can be determined at block 610. In various embodiments, a smart reminder trigger condition can be satisfied based on just a connection state, or based on a connection state in conjunction with a motion state. For example, based on a connectivity state and/or a motion state of the mobile device, it can be determined that the mobile device has exited a car. In this example, exit from the car can be inferred using input sensor information such as motion activity and non-motion activity (e.g., connectivity to a car processor). For instance, a loss of a Bluetooth connection to a car processor can be used as a criteria in conjunction with motion activity to infer that the mobile device has exited the car.

A smart reminder can be triggered when a connection state of the device (e.g., connected, disconnected) is determined at block 610 and it is subsequently determined at block 630 that the connection state has changed or transitioned (e.g., from connecting to connected or from connected to disconnected). For example, a user may set a reminder to "Purchase fruit at grocery store" with a related reminder to "get shopping bag from trunk" when exiting the vehicle. However, if the reminder is triggered as soon as the user enters the parking lot of the grocery store, then the reminder may not be beneficial since the user may forget the content of the reminder by the time the user has parked in a parking lot at the grocery store and exited a vehicle. Therefore, in accordance with some embodiments, the smart reminder is not triggered until the device determines that the device is arrived and settled at the grocery store.

At block 620, it is determined whether the determined states include a connection state of the device. In block 620, it is determined whether communications connection and disconnection status information is obtained from the sensors. The connection state can be used to determine whether the device has connected (or disconnected) with a vehicle. If the connection state is determined, control is passed to block 630. Otherwise, control is passed to 650 and the reminder is not triggered.

A combination of a connection state and a transition from one connection state to another can be used to determine that a reminder is to be triggered. For example, when the connection state determined at block 610 indicates that the device is connected and a transition to the disconnected state is detected at block 630, control is passed to block 640 to trigger a reminder. Detecting a transition from a connected state to a disconnected state can be used to determine that a device has exited the vehicle. For example, based on the sensor information, the device can determine whether the device has been connected to or disconnected from a device, system, or processor of a car. If a change in connection or disconnection status is detected at block 630, then the reminder is triggered at block 640. However, if no change in connection or disconnection information is detected at block 630, then the reminder is not triggered and control is passed to block 650.

Connection to or disconnection from a car can be based on information that the device is connected or disconnected from a Bluetooth device in the car or connection or disconnection of the device from a program on the car, such as CarPlay.

For example, if a user creates a reminder to "Fasten seatbelt when in car," when the device recognizes a Bluetooth device of the car or establishes a communication connection with the car, the reminder can then be triggered. If a user creates a reminder to "Remove bag from trunk," when the device recognizes that the communication connection between the mobile device and the car has been terminated or that the mobile device no longer recognizes the Bluetooth device of the car, the reminder can then be triggered. Pairing of the device with the Bluetooth device of the car would assist in the device recognition.

Therefore, the reminder is not triggered merely because the device is in the vicinity of the user's car, but because additional information is obtained, thus making the reminder more beneficial to the user.

Although a car has been described as an example vehicle, connection and disconnection information of the device to any vehicle, such as an airplane, a bus, a passenger train railway car, and a ship, can be obtained in order to determine triggering of a reminder.

Also, although the states of motion and time and connection and disconnection are described as example states which can be included in a list of states of the device, these are merely examples and other states can be used to determine that the device has arrived and settled at a location. Further, the order of determining the states of the device can be changed.

For example, vibration information can be used to determine whether the device has entered or exited a vehicle. If the user has created a reminder to remind the user to fasten their seatbelt when they get in their car, the vibration information of the car can be used in conjunction with or in lieu of the connection state to trigger the reminder. Specifically, the vibration of, for example, the engine of the car, is sensed by sensors on the device. The device can then determine that the user is now in the vehicle and is in a position to fasten their seatbelt. Therefore, upon sensing that the user is in the car and has started the car, the reminder to "fasten seatbelt" is triggered.

Further, barometric pressure or atmospheric pressure information can be used to determine whether the device has arrived and is settled at a location. For example, a sensor in the device senses that the pressure in the car has changed because the door has been closed. The device can then determine that the user has now closed the door of the car and is in a position to fasten their seatbelt. Therefore, upon sensing that the user is in the car and has closed the car door, the reminder to "fasten seatbelt" is triggered.

III. User Interfaces for Creating Reminders

As discussed above, a smart reminder can be created by a user of a mobile device. Specifically, the device can receive a request to establish a connection state for the device for triggering a smart reminder. The request can include a flag indicating that other sensor information is to be used to determine when to provide the smart reminder to the user.

A smart reminder can be input via, for example, a user interface or a voice command. Specifically, the content of the reminder, location information and opportune mode information can be input via a user interface or as a voice command.

Figure 7C:
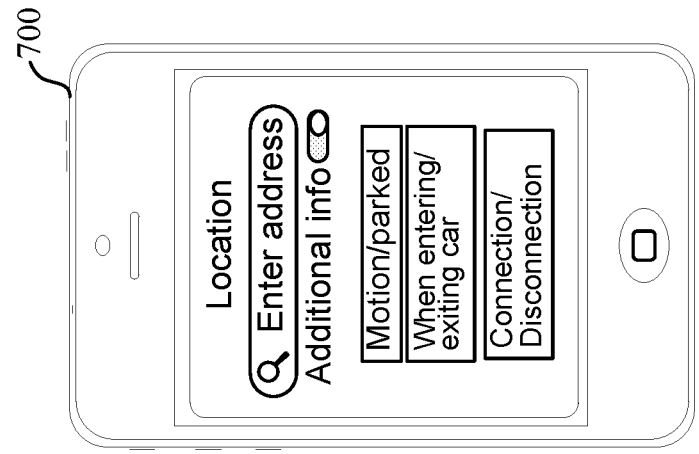
FIGS. 7A, 7B, and 7C illustrate input of a reminder via a user interface according to embodiments of the present invention.
Figure 7B:
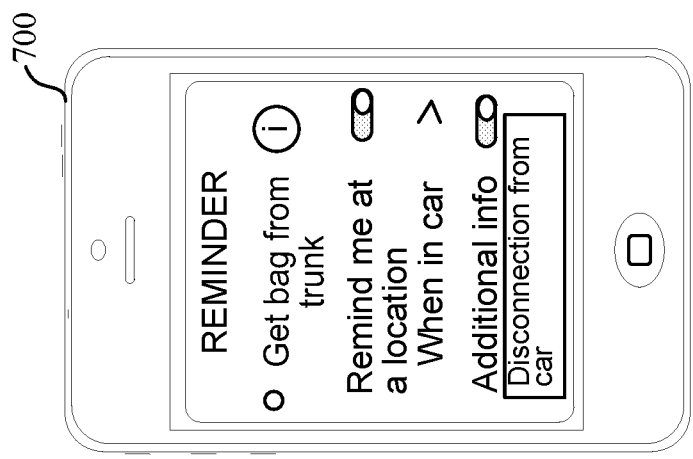
Figure 7A:
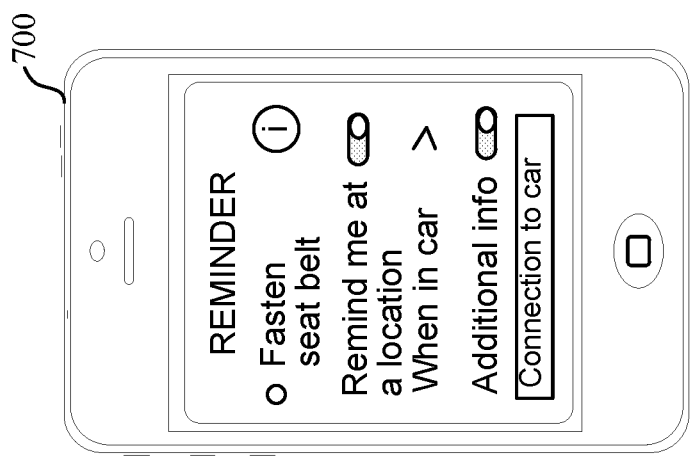

FIGS. 7A, 7B, and 7C illustrate input of the smart reminder via a user interface according to an exemplary embodiment. As shown in FIG. 7A, the user selects the reminder icon on a user interface of their device 700 (e.g. mobile phone) to create a reminder. The user interface can be, for example, a graphical user interface (GUI).

For example, the user can create a reminder to "Fasten seat belt" and selects the option to trigger the reminder according to a location. As shown in FIG. 7A, the location can be a car and additional information for triggering the reminder can be provided. The car can be a car that device 700 has previously connected to (i.e., been paired with). The user interface can present a list of all vehicles that device 700 has paired with in a predetermined time frame (e.g., the past week or month). For example, the list of vehicles can include one or more motor vehicles that device 700 has connected to in the past month. By selecting the option to trigger the reminder according to a location, the reminder will not be triggered until the device has entered the designated vehicle.

After the user has indicated that the reminder will be based on a location, as shown in FIGS. 7A, 7B, and 7C, the user can also indicate that additional information should be determined before triggering the smart reminder. As seen in FIG. 7A, the user can subsequently enter additional information for the reminder, such as a condition that device 700 establish a connection with the selected car before the "Fasten seat belt" reminder is triggered.

In the example of FIG. 7B, the user can create a reminder to "Get bag from trunk," select the option to trigger the reminder when in the car location, and provide additional information indicating that disconnection information should also be determined before triggering the smart reminder. The reminder will then be triggered after device 700 is in the selected car and the selected disconnection information is detected.

FIG. 7C shows that the additional information provided for a location can include an address for a location. However, in the example of FIG. 7C, for reminders where the location is a car, an address may not be known or appropriate. Instead, additional information can be entered to trigger the reminder based on device 700 entering or exiting a car. For example, the additional information can indicate whether the reminder should be triggered when the car (or device 700) is in motion, when the car is in a parked state, when device 700 is entering the car, when device 700 is exiting the car, and/or based on a connection state for device 700 (e.g., device is connecting or disconnecting with the car).

FIGS. 7A, 7B, and 7C illustrate an example of creating a smart reminder according to the exemplary embodiments, however, various methods of entering a smart reminder can be used and is not limited to the examples described herein.

A. Voice Commands

When a user inputs the smart reminder via voice commands, the user verbally enters the reminder on their device. For example, the user selects an audio input button and enters a reminder such as "Fasten seatbelt when in car." In this example, voice commands are input via a microphone of the mobile device and the reminder is set.

Selection of an audio input button is described, however, any method of inputting audio by a user can be used.

B. Reminder List Interface

Figure 8:
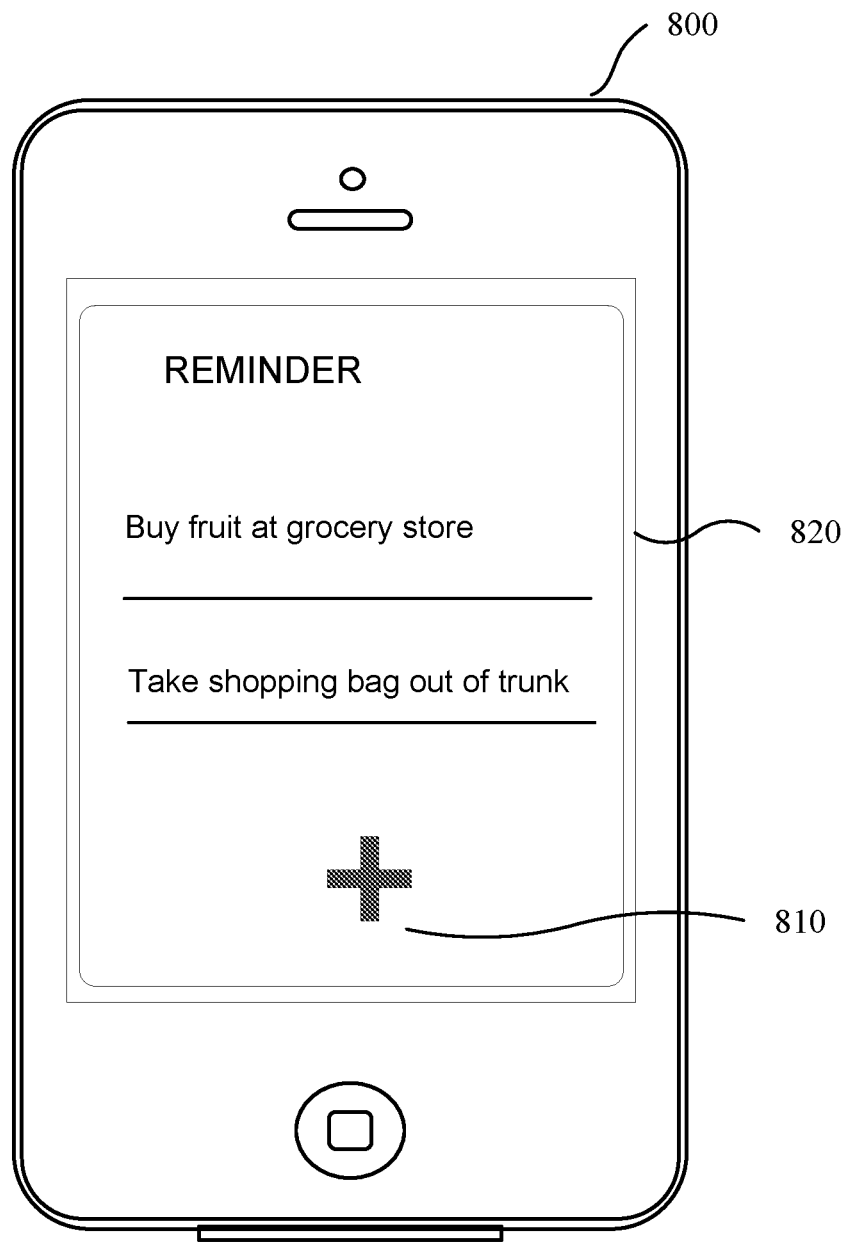
FIG. 8 illustrates a user interface for creating a reminder according to embodiments of the present invention.

In another exemplary embodiment, as shown in FIG. 8, reminders can be easily added to a reminder sheet by selecting an icon on a device 800. FIG. 8 illustrates a user interface for adding a reminder to a reminder list. As shown in FIG. 8, a "+" image 810 appears on a reminder sheet 820 of device 800. A reminder sheet 820 is a page that is displayed on device 800 interface that includes reminders created by the user. Therefore, when the user desires to add or create a reminder, the user selects or taps on the "+" image 810 to easily add a reminder to the reminder sheet 820. In the example of FIG. 8, the "+" image 810 can be selected to add a reminder related to an existing reminder. As shown, a reminder related to an existing reminder to "Buy fruit at grocery store" can be created by selecting the "+" image 810. As shown, the related reminder includes reminder content to "Take shopping bag out of trunk." Such content can be displayed, for example, when device 800 arrives at the grocery store and device 800 disconnects from the car (e.g., the device exits the car).

Further, since the "+" image 810 continuously appears on the reminder sheet, a reminder can be easily added even if there are numerous reminders on the reminder sheet. In this way, a user does not have to scroll to the end of the sheet in order to add a new reminder.

Although a "+" image 810 is used in FIG. 8, other images can be used to indicate addition or creation of a reminder, and is not limited to the examples described herein.

Voice input and user interface input of reminders has been described, however, the exemplary embodiments are not limited to these examples and other methods of inputting a reminder can be used.

Further, creation of a reminder can be performed on any device that is capable of creating a reminder including a mobile device (e.g. mobile phone, laptop) and a desktop computer.

IV. Example Device

Figure 9:
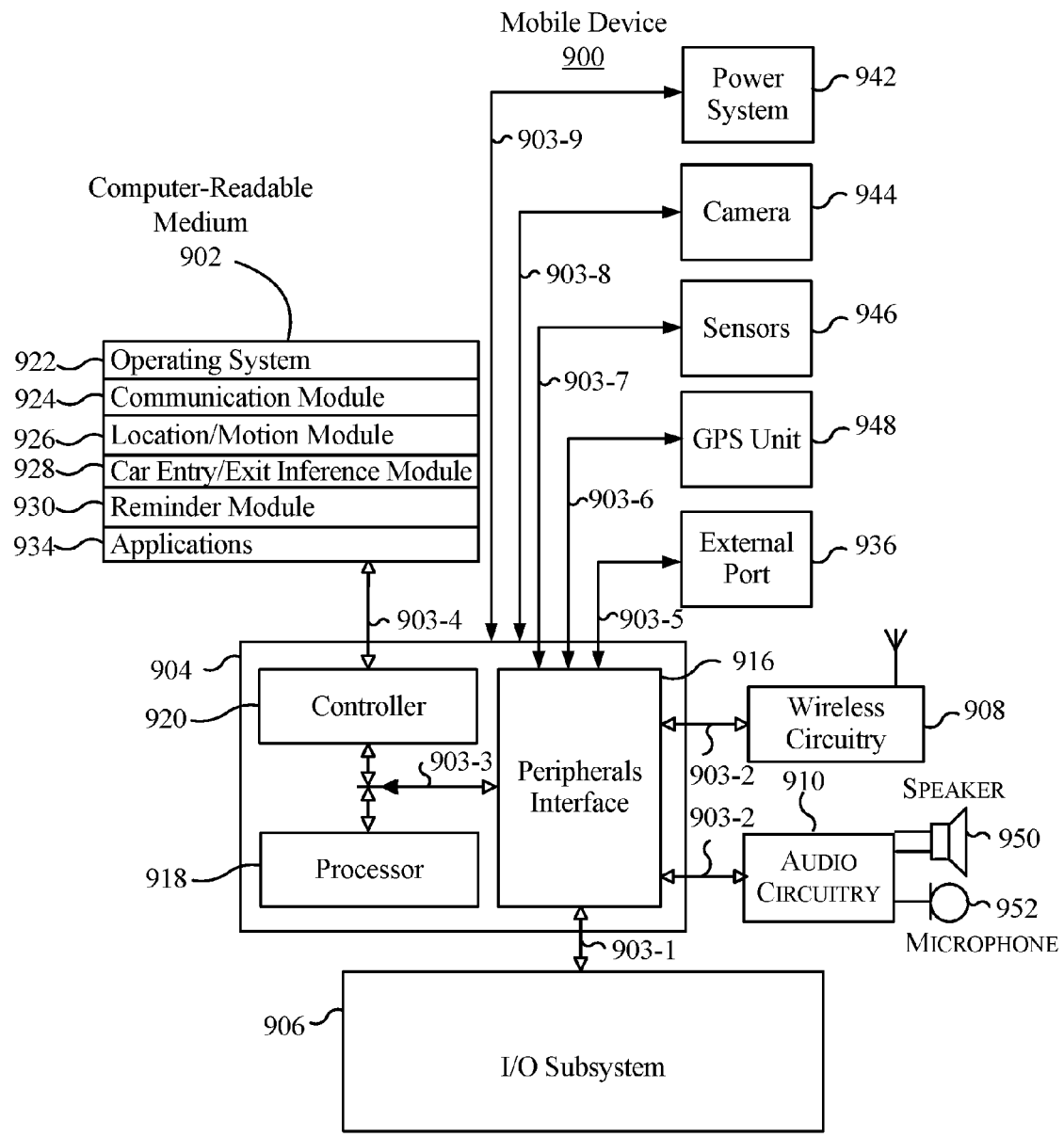
FIG. 9 is a block diagram of an example device according to embodiments of the present invention.

FIG. 9 is a block diagram of an example device according to an exemplary embodiment. Specifically, FIG. 9 is a block diagram of an example device 900, which may be a mobile device. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a car entry/exit inference module 928, a reminder module 930 (e.g., corresponding to reminder applications described herein), and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926.

In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Car entry/exit inference module 928 can assist in determining whether mobile device 900 has entered or exited a vehicle. Car entry/exit inference module 928 and reminder module 930 can each include various sub-modules or systems, e.g., as described above with respect to FIGS. 2 and 3. For example, car entry/exit inference module 928 can include the vehicle entry/exit determiner 330 depicted in FIG. 3. Also, for example, reminder module 930 can correspond to the reminder application 300 shown in FIG. 3.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and one or more input devices such as a keyboard, mouse, and/or track pad (i.e., user input devices). In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display. That is, the touch-sensitive display can be an input device.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A computer-implemented method for providing a reminder to a user of a mobile device, the method comprising, at the mobile device:
    receiving, from the user, a request to establish the reminder;
    providing a plurality of reminder options, each corresponding to a different category of reminders, wherein a first reminder option of the plurality of reminder options corresponds to a connection state of the mobile device with a vehicle;
    receiving a first selection of the first reminder option for the reminder;
    receiving an indication of a first transition that is to trigger the reminder, the first transition corresponding to the mobile device establishing a wireless connection to a processor of the vehicle or the mobile device disconnecting from the processor of the vehicle;
    receiving content for the reminder;
    detecting the first transition between the mobile device and the processor of the vehicle; and
    in response to detecting the first transition, providing the content of the reminder to the user.

2. The method of claim 1, wherein the first reminder option corresponds to the connection state of the mobile device to any motor vehicle.

3. The method of claim 1, further comprising, at the mobile device:
    providing a list of one or more vehicles to which the mobile device has previously connected; and
    receiving a second selection of the vehicle from the list, wherein the first transition is restricted to the connection state of the mobile device with the vehicle.

4. The method of claim 3, wherein the list of one or more vehicles to which the mobile device has previously connected includes one or more motor vehicles the mobile device has connected within a time frame.

5. The method of claim 1, wherein the first transition corresponds to the mobile device disconnecting from the processor of the vehicle.

6. The method of claim 1, wherein the first transition corresponds to the mobile device connecting to the processor of the vehicle.

7. The method of claim 1, wherein receiving the indication of the first transition comprises receiving connection or disconnection information of the mobile device from one or more sensors of the mobile device.

8. The method of claim 1, wherein providing the content of the reminder to the user comprises providing one of an audio alert, text content, an image, a video, and an audio message.

9. A computer product comprising a non-transitory computer readable medium storing a plurality of instructions for providing a reminder to a mobile device, that when executed on one or more processors of the mobile device, perform operations comprising:
    receiving, from a user, a request to establish the reminder;
    providing a plurality of reminder options, each corresponding to a different category of reminders, wherein a first reminder option of the plurality of reminder options corresponds to a connection state of the mobile device with a vehicle;
    receiving a first selection of the first reminder option for the reminder;
    receiving an indication of a first transition that is to trigger the reminder, the first transition corresponding to the mobile device establishing a wireless connection to a processor of the vehicle or the mobile device disconnecting from the processor of the vehicle;
    receiving content for the reminder;
    detecting the first transition between the mobile device and the processor of the vehicle; and
    in response to detecting the first transition, providing the content of the reminder to the user.

10. The computer product of claim 9, wherein the first reminder option corresponds to the connection state of the mobile device to any motor vehicle.

11. The computer product of claim 9, further comprising, at the mobile device:
    providing a list of one or more vehicles to which the mobile device has previously connected; and
    receiving a second selection of a first vehicle from the list, wherein the first transition is restricted to the connection state of the mobile device with the first vehicle.

12. The computer product of claim 11, wherein the list of one or more vehicles to which the mobile device has previously connected includes one or more motor vehicles the mobile device has connected within a predetermined time frame.

13. The computer product of claim 11, wherein the list of one or more vehicles to which the mobile device has previously connected includes one or more motor vehicles the mobile device has connected within a selected time frame.

14. The computer product of claim 9, wherein the first transition corresponds to the mobile device disconnecting from the processor of the vehicle.

15. A mobile device comprising:
    one or more sensors;
    an input device;
    one or more processors configured to:
        receive, from a user, at the input device, a request to establish a reminder;
        provide a plurality of reminder options, each corresponding to a different category of reminders, wherein a first reminder option of the plurality of reminder options corresponds to a connection state of the mobile device with a vehicle;
        receive, at the input device, a first selection of the first reminder option for the reminder;
        receive an indication of a first transition that is to trigger the reminder, the first transition corresponding to the mobile device establishing a wireless connection to a processor of the vehicle or the mobile device disconnecting from the processor of the vehicle;
        receive content for the reminder;
        detect, by the one or more sensors, the first transition between the mobile device and the processor of the vehicle; and in response to detecting the first transition, provide the content of the reminder to the user.

16. The mobile device of claim 15, wherein the first reminder option corresponds to the connection state of the mobile device to any motor vehicle.

17. The mobile device of claim 15, further comprising a display, wherein the one or more processors are further configured to:
provide, on the display a list of one or more vehicles to which the mobile device has previously connected; and
receive, at the input device, a second selection of a first vehicle from the list, wherein the first transition is restricted to the connection state of the mobile device with the first vehicle.

18. The mobile device of claim 17, wherein the list of one or more vehicles to which the mobile device has previously connected includes one or more motor vehicles the mobile device has connected within a time frame, wherein the one or more processors are further configured to:
receive, at the input device, a selection of the time frame.

19. The mobile device of claim 17, wherein providing the content of the reminder to the user comprises providing at least one of text content, an image, and a video on the display.

20. The mobile device of claim 15, wherein the first transition corresponds to the mobile device disconnecting from the processor of the vehicle.

\* \* \* \* \*